United States Patent
Singh et al.

(10) Patent No.: US 10,902,510 B2
(45) Date of Patent: Jan. 26, 2021

(54) SYSTEMS AND METHODS FOR ANALYSIS OF WEARABLE ITEMS OF A CLOTHING SUBSCRIPTION PLATFORM

(71) Applicant: CaaStle, Inc., New York, NY (US)

(72) Inventors: Jaswinder Pal Singh, New York, NY (US); Amy Kang, Richmond Hill, NY (US); Christine M. Hunsicker, New York, NY (US); Georgiy Goldenberg, Los Altos, CA (US); Dongming Jiang, Los Angeles, CA (US); Chirag Jain, Delhi (IN); Prashant Rao, Sunnyvale, CA (US); Prashant TR Rao, San Jose, CA (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 16/947,263

(22) Filed: Jul. 24, 2020

(65) Prior Publication Data

US 2020/0402148 A1 Dec. 24, 2020

Related U.S. Application Data

(63) Continuation-in-part of application No. 16/381,132, filed on Apr. 11, 2019, now Pat. No. 10,796,276.

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0643* (2013.01); *G06Q 10/087* (2013.01); *G06Q 10/0833* (2013.01); *G06Q 10/0837* (2013.01)

(58) Field of Classification Search
None
See application file for complete search history.

(56) References Cited

U.S. PATENT DOCUMENTS

| 5,930,769 A | 7/1999 | Rose |
| 8,682,804 B1 | 3/2014 | Yoon |

(Continued)

FOREIGN PATENT DOCUMENTS

WO WO-2008132316 A2 * 11/2008 ........... G06Q 10/087

OTHER PUBLICATIONS

Jetinder Singh "The What, Why, and How of a Microservices Architecture" Jun. 7, 2018. Retrieved from https://medium.com/hashmapinc/the-what-why-and-how-of-a-microservices-architecture-4179579423a9 (Year: 2018).*

(Continued)

*Primary Examiner* — Naeem U Haq
(74) *Attorney, Agent, or Firm* — Bookoff McAndrews, PLLC

(57) ABSTRACT

Disclosed are methods, systems, and non-transitory computer-readable medium for dynamically managing data associated with transactions of wearable items. For example, a method may include receiving wearable item data from one or more electronic tenant interfaces, hosting an electronic warehouse operations portal and/or an electronic administrative portal, receiving one or more electronic user transactions initiated at one or more user platforms, updating one or more transaction databases and one or more analytics databases, based on the one or more electronic user transactions, receiving one or more wearable item operations requests, initiating one or more microservices to fulfill the one or more wearable item operations requests, and updating at least one of the one or more transaction databases and one or more analytics databases based on completion of the one or more wearable item operations requests.

19 Claims, 13 Drawing Sheets

(56) References Cited

U.S. PATENT DOCUMENTS

| | | | |
|---|---|---|---|
| 8,976,230 B1 | 3/2015 | Vendrow | |
| 9,081,863 B2 | 7/2015 | Error et al. | |
| 9,619,535 B1 | 4/2017 | Kapoor et al. | |
| 9,639,880 B2 | 5/2017 | Dalal et al. | |
| 9,799,064 B2 | 10/2017 | Ohnemus et al. | |
| 2002/0052805 A1* | 5/2002 | Seki | G06Q 30/02 705/27.2 |
| 2002/0121980 A1 | 9/2002 | Wan et al. | |
| 2002/0143655 A1 | 10/2002 | Elston et al. | |
| 2003/0023514 A1 | 1/2003 | Adler et al. | |
| 2004/0143518 A1 | 7/2004 | Siegel | |
| 2004/0249712 A1 | 12/2004 | Brown et al. | |
| 2005/0114221 A1 | 5/2005 | Walters et al. | |
| 2008/0010173 A1 | 1/2008 | Rendich et al. | |
| 2008/0126190 A1 | 5/2008 | Gosnell et al. | |
| 2008/0294996 A1 | 11/2008 | Hunt et al. | |
| 2010/0030663 A1 | 2/2010 | Wannier et al. | |
| 2010/0111370 A1 | 5/2010 | Black et al. | |
| 2010/0262521 A1 | 10/2010 | Robinson et al. | |
| 2011/0107263 A1 | 5/2011 | Ivanov | |
| 2012/0158553 A1 | 6/2012 | Sudhidhanakul et al. | |
| 2012/0246110 A1 | 9/2012 | Fischer | |
| 2013/0080251 A1 | 3/2013 | Dempski | |
| 2013/0085814 A1 | 4/2013 | Sharpe et al. | |
| 2013/0151371 A1 | 6/2013 | Moss | |
| 2013/0211973 A1 | 8/2013 | Tomlinson | |
| 2014/0025533 A1 | 1/2014 | Lv | |
| 2014/0176565 A1* | 6/2014 | Adeyoola | G06F 16/5854 345/473 |
| 2014/0279186 A1 | 9/2014 | Juan et al. | |
| 2014/0379507 A1 | 12/2014 | Pitt | |
| 2015/0142855 A1 | 5/2015 | Fast et al. | |
| 2015/0145671 A1 | 5/2015 | Cohen et al. | |
| 2015/0302505 A1 | 10/2015 | Di et al. | |
| 2015/0317719 A1 | 11/2015 | Berg et al. | |
| 2016/0321547 A1* | 11/2016 | Johnson | G06Q 10/087 |
| 2017/0000277 A1 | 1/2017 | Johnson et al. | |
| 2017/0091844 A1 | 3/2017 | Yarvis et al. | |
| 2017/0243282 A1 | 8/2017 | Koulis et al. | |
| 2017/0287044 A1 | 10/2017 | Rose et al. | |
| 2018/0005375 A1* | 1/2018 | Krimon | G06K 9/6267 |
| 2018/0218433 A1* | 8/2018 | Penner | G06Q 30/0643 |
| 2018/0240280 A1 | 8/2018 | Chen et al. | |
| 2018/0330199 A1* | 11/2018 | Nogami | G06K 9/4652 |
| 2019/0347668 A1 | 11/2019 | Williams et al. | |
| 2020/0005116 A1 | 1/2020 | Kuo | |
| 2020/0265292 A1* | 8/2020 | Chang | G06N 3/0427 |
| 2020/0302378 A1* | 9/2020 | Palaka | G06Q 30/0639 |

OTHER PUBLICATIONS

No author "Microservices architecture style" Microservices architecture style—Azure Application Architecture Guide | Microsoft Docs Oct. 30, 2020. Retrieved from https://docs.microsoft.com/en-us/azure/architecture/guide/architecture-styles/microservices (Year: 2020).*

No author "Why Clothing As A Service Is The Future Of Fashion", Mar. 29, 2018. Retrieved from https://www.pymnts.com/news/retail/2018/gwynnie-bee-ecommerce-apparel-retail-subscription/ (Year: 2018).*

Laura Robbins "Unlocking the Reuse Revolution for Fashion: A Canadian Case Study" Toronto, Ontario, Canada, 2019 (Year: 2019).*

Tom Huston "What is Microservices?" Retrieved from https://smartbear.com/solutions/microservices/ (Year: 2020).*

Ziwei Liu et al., "DeepFashion: Powering Robust Clothes Recognition and Retrieval with Rich Annotations", Jun. 2016, Web. (5 pages) http://mmlab.ie.cuhk.edu.hk/projects/DeepFashion.html.

S. M. Sofiqul Islam et al., "A CNN Based Approach for Garments Texture Design Classification", Feb. 8, 2017, pp. 119-125, vol. 2, No. 4, Advances in technology Innovation. (7 pages).

Menglin Jia et al., "A Deep-Learning-Based Fashion Attributes Detection Model", pp. 1-7, Cornell University. (7 pages).

Kota Yamaguchi, "PaperDoll Parsing", Oct. 28, 2016, Web. (5 pages). http://vision.is.tohoku.ac.jp/~kyamagu/research/paperdoll/.

International Search Report and Written Opinion of the International Searching Authority for PCT/US2020/027230, dated Apr. 8, 2020 (16 pages).

\* cited by examiner

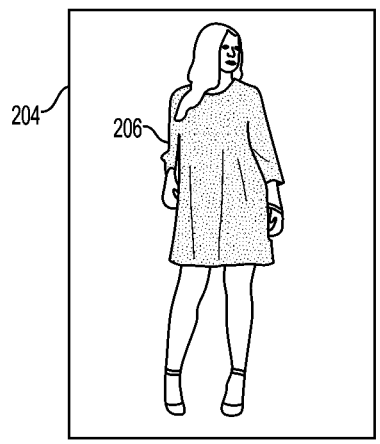
Fig.4A
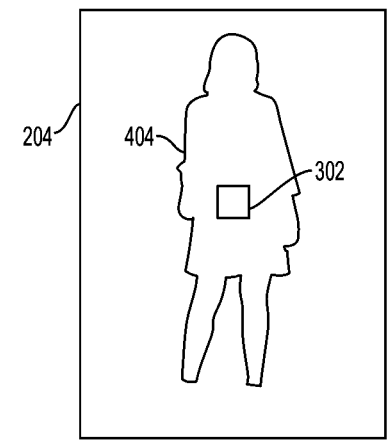
Fig.4B
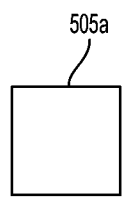  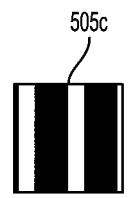 
Fig.5A
 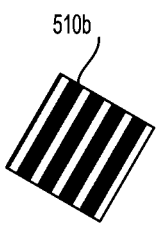  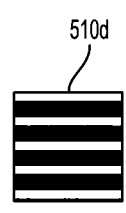
Fig.5B

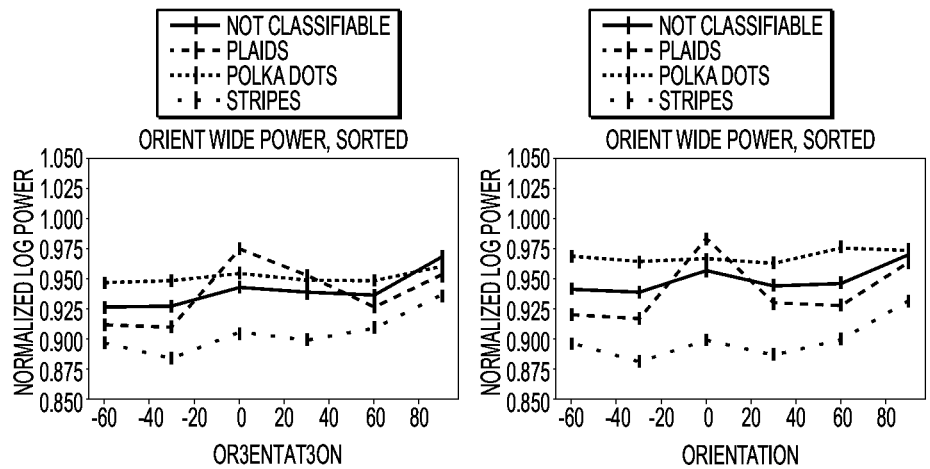
Fig.7B  Fig.7C
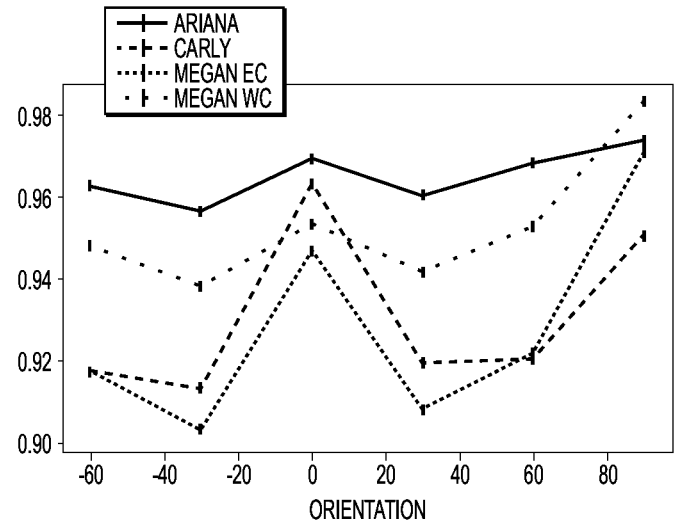
Fig.7D

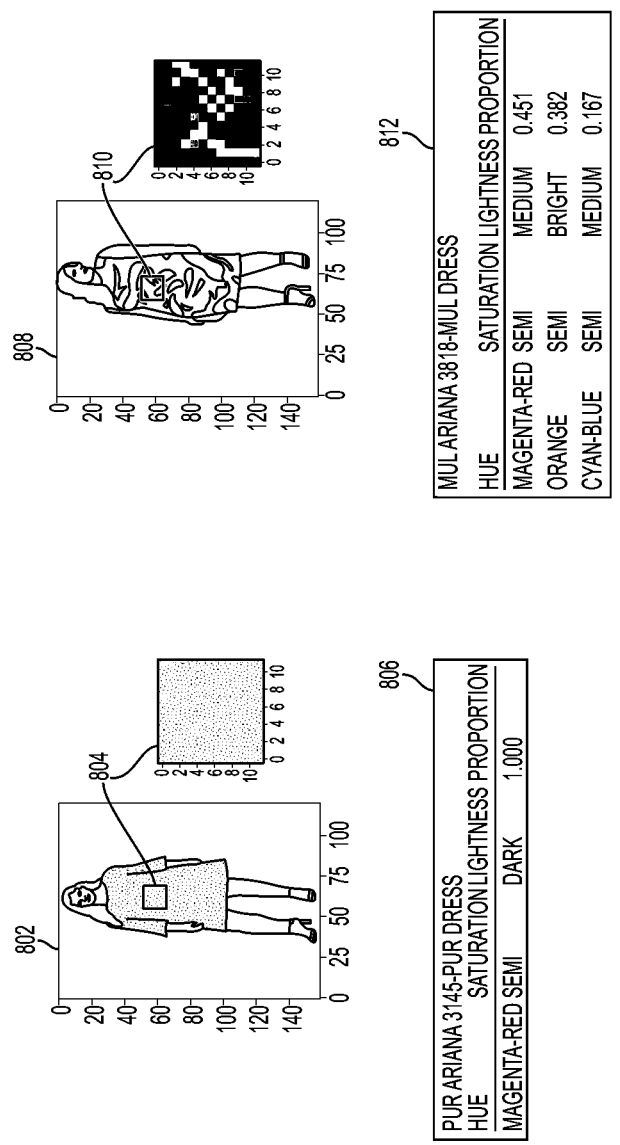

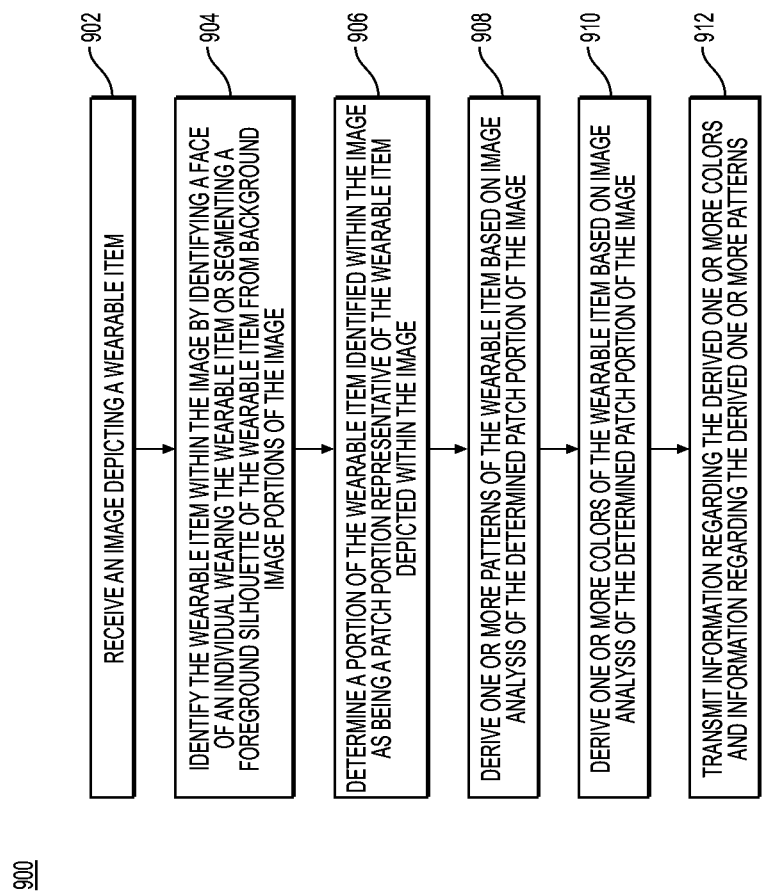

SYSTEMS AND METHODS FOR ANALYSIS OF WEARABLE ITEMS OF A CLOTHING SUBSCRIPTION PLATFORM

CROSS REFERENCE TO RELATED APPLICATION(S)

This application is a continuation-in-part of and claims the benefit of priority to pending U.S. patent application Ser. No. 16/381,132, filed Apr. 11, 2019, the entirety of which is incorporated by reference herein.

TECHNICAL FIELD

Various embodiments of the present disclosure generally relate to an electronic platform for distribution of wearable items and, more particularly, to dynamically managing electronic data associated with purchase, rental, or subscription-based online transactions of wearable items. Other embodiments of the present disclosure generally relate to image processing, and more particularly, to analyzing wearable items depicted in an image and dynamically managing electronic data associated with purchase, rental, or subscription-based online transactions of wearable items.

BACKGROUND

For online subscription-based services or retail transactions, a key driver for maintaining user satisfaction is ensuring that the underlying electronic data is easily accessible, dynamically updated, and reliably maintained. Such an objective may be important not only for the quality of service and interface provided to the front-end users, but also for ensuring that the back office staff and/or the business partners of integrated systems are provided with an up-to-date, and reliable electronic platform on which to operate. Each of those interfaces and components may contribute to the overall functioning of the entire electronic platform. For example, the functions reliably carried out by a user interface for warehouse associates may be important for the functioning of the organization's system as a whole, as they heavily contribute to the efficiency in handling and processing front-end users' order fulfillment. Thus, it may be highly desirable for an online service provider to streamline the system and the process in which different user interfaces, computer-implemented services, and automations integrate together in a connected platform, in such a way that customer actions and back office tasks trigger each others' responsive actions in an efficient manner, while some back office tasks run in the background based on automations and/or staff actions.

In some cases, it can be helpful to perform image processing and object recognition when operating a clothing subscription platform. Conventional methods for image processing for object recognition generally utilize "deep learning" neural network approaches. Neural networks simulate real neural networks, such as the human brain, through simple simulated neurons (also referred to as nodes) connected through a series of layers. Such neural networks "learn" through the feedback of the correct responses provided to the neural networks. This process is also referred to as "training." In the context of neural networks, the term "deep" refers to the number of layers within a neural network where a deep network has more layers than a shallow network.

A neural network specifically designed for image processing is referred to as a Convolutional Neural Network (CNN). The convolutional layers in such neural networks filter part of the image looking for certain visual attributes. For example, one convolution might look for narrow vertical bars. CNNs have been utilized for visual object recognition. In some instances, CNNs approximate and improve upon human object recognition performance.

With respect to wearable item image analysis, a number of neural network approaches have been proposed. As an example, one available neural network approach takes a user-submitted image, recognizes a wearable item included in the image, and identifies the same or similar wearable item in an inventory. That neural network approach applies to a broad range of products in addition to wearable items. While the neural network approach described above may have some merits, there are two recognized issues with the neural network approach: (1) the significant amount of resources and (2) lack of explainability.

With respect to the first issue, the neural network approach requires a significant amount of data and computational resources to train a neural network model. As an example, a million images may be considered a typical number of images used for training a neural network model. Furthermore, such images must be pre-labeled with correct responses. For example, images of wearable items used for training must also include the correct style characteristics. For specialized uses, such as wearable item style analysis, data sets with correct style characteristics are difficult to find and/or are expensive. Moreover, the hardware (e.g., graphics processing units "GPUs" or tensor processing units "TPUs") used to train neural network models at any level of efficiency is specifically designed for neural network modeling, and is expensive to buy or rent. For example, typical third party cloud services rent GPUs for 1 to 24 dollars per hour, and a typical training run may last several days.

With respect to the second issue, while the results provided by the neural network approach may be accurate, it is difficult to explain how the neural network models reached such results. Most of the processing for neural network models is conducted in "hidden" layers between an input (e.g., an image) and an output (e.g., results). This lack of transparency makes it difficult to explain how the results were achieved, therefore making it difficult to perform an act at a functional level (e.g., providing recommendations to merchandising) based on the results provided by the neural network model.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for color and pattern analysis of wearable items depicted in images to overcome the problems with conventional methods noted above. Advantages provided by the embodiments disclosed herein include avoiding training of a neural network, thus avoiding excessive costs and computational resources associated with the neural network approach. Further, the embodiments disclosed herein provide transparent and explainable results.

In one embodiment, a computer-implemented method comprises: receiving, by one or more processors, an image depicting a wearable item; identifying, by the one or more processors, the wearable item within the image by identifying a face of an individual wearing the wearable item or segmenting a foreground silhouette of the wearable item from background image portions of the image; determining, by the one or more processors, a portion of the wearable item identified within the image as being a patch portion representative of the wearable item depicted within the image; deriving, by the one or more processors, one or more patterns of the wearable item based on image analysis of the determined patch portion of the image; deriving, by the one or more processors, one or more colors of the wearable item based on image analysis of the determined patch portion of the image; and transmitting, by the one or more processors, information regarding the derived one or more colors and information regarding the derived one or more patterns.

In accordance with another embodiment, a computer system comprises: a memory having processor-readable instructions stored therein; and at least one processor configured to access the memory and execute the processor-readable instructions, which when executed by the at least one processor configures the at least one processor to perform a plurality of functions, including functions for: receiving an image depicting a wearable item; identifying the wearable item within the image by identifying a face of an individual wearing the wearable item or segmenting a foreground silhouette of the wearable item from background image portions of the image; determining a portion of the wearable item identified within the image as being a patch portion representative of the wearable item depicted within the image; deriving one or more patterns of the wearable item based on image analysis of the determined patch portion of the image; deriving one or more colors of the wearable item based on image analysis of the determined patch portion of the image; and transmitting information regarding the derived one or more colors and information regarding the derived one or more patterns.

In accordance with another embodiment, a non-transitory computer-readable medium contains instructions for: receiving an image depicting a wearable item; identifying the wearable item within the image by identifying a face of an individual wearing the wearable item or segmenting a foreground silhouette of the wearable item from background image portions of the image; determining a portion of the wearable item identified within the image as being a patch portion representative of the wearable item depicted within the image; deriving one or more patterns of the wearable item based on image analysis of the determined patch portion of the image; deriving one or more colors of the wearable item based on image analysis of the determined patch portion of the image; and transmitting information regarding the derived one or more colors and information regarding the derived one or more patterns.

According to at least some aspects of the disclosure, systems and methods are disclosed to dynamically managing electronic data associated with transactions of wearable items.

In one embodiment, a computer-implemented method is disclosed for dynamically managing electronic data associated with transactions of wearable items. The computer-implemented method may comprise: receiving, by one or more processors, wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks; hosting, by the one or more processors, an electronic warehouse operations portal and an electronic administrative portal, the electronic warehouse operations portal and electronic administrative portal comprising user interfaces accessible from one or more employee devices over the one or more networks; receiving, by the one or more processors, one or more electronic user transactions initiated at one or more user platforms, each of the one or more electronic user transactions associated with at least one unique user identifier and at least one unique item identifier identifying wearable item described in the received wearable item data, wherein the one or more user platforms comprise one or more user interfaces accessible from one or more user devices over the one or more networks; in response to receiving the one or more electronic user transactions, updating, by the one or more processors, one or more transaction databases and one or more analytics databases, based on the one or more electronic user transactions; receiving, by one or more processors, one or more wearable item operations requests from at least one of the electronic warehouse operations portal, the electronic administrative portal, and the one or more electronic tenant interfaces to initiate order processing of a wearable item identified by the unique user identifier and the unique item identifier for a user identified by the received unique user identifier; in response to receiving the one or more wearable item operations requests, initiating one or more microservices to fulfill the one or more wearable item operations requests; and updating at least one of the one or more transaction databases and one or more analytics databases based on completion of the one or more wearable item operations requests.

In accordance with another embodiment, a computer system is disclosed for dynamically managing electronic data associated with transactions of wearable items. The computer system may comprise: a memory having processor-readable instructions stored therein; and at least one processor configured to access the memory and execute the processor-readable instructions, which when executed by the processor configures the processor to perform a plurality of functions, including functions for: receiving wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks; hosting an electronic warehouse operations portal and an electronic administrative portal, the electronic warehouse operations portal and electronic administrative portal comprising user interfaces accessible from one or more employee devices over the one or more networks; receiving one or more electronic user transactions initiated at one or more user platforms, each of the one or more electronic user transactions associated with at least one unique user identifier and at least one unique item identifier identifying wearable item described in the received wearable item data, wherein the one or more user platforms comprise one or more user interfaces accessible from one or more user devices over the one or more networks; in response to receiving the one or more electronic user transactions, updating one or more transaction databases and one or more analytics databases, based on the one or more electronic user transactions; receiving one or more wearable item operations requests from at least one of the electronic warehouse operations portal, the electronic administrative portal, and the one or more electronic tenant interfaces to initiate order processing of a wearable item identified by the unique user identifier and the unique item identifier for a user identified by the received unique user identifier; in response to receiving the one or more wearable item operations requests, initiating one or more microservices to fulfill the one or more wearable item operations requests; and updating at least one of the one or more transaction databases and one or more analytics databases based on completion of the one or more wearable item operations requests.

In accordance with another embodiment, a non-transitory computer-readable medium containing instructions is disclosed for dynamically managing electronic data associated with transactions of wearable items. The non-transitory computer-readable medium may comprise instructions for: receiving wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks; hosting an electronic warehouse operations portal and an electronic administrative portal, the electronic warehouse operations portal and electronic administrative portal comprising user interfaces accessible from one or more employee devices over the one or more networks; receiving one or more electronic user transactions initiated at one or more user platforms, each of the one or more electronic user transactions associated with at least one unique user identifier and at least one unique item identifier identifying wearable item described in the received wearable item data, wherein the one or more user platforms comprise one or more user interfaces accessible from one or more user devices over the one or more networks; in response to receiving the one or more electronic user transactions, updating one or more transaction databases and one or more analytics databases, based on the one or more electronic user transactions; receiving one or more wearable item operations requests from at least one of the electronic warehouse operations portal, the electronic administrative portal, and the one or more electronic tenant interfaces to initiate order processing of a wearable item identified by the unique user identifier and the unique item identifier for a user identified by the received unique user identifier; in response to receiving the one or more wearable item operations requests, initiating one or more microservices to fulfill the one or more wearable item operations requests; and updating at least one of the one or more transaction databases and one or more analytics databases based on completion of the one or more wearable item operations requests.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A-4B depict a method of locating a patch portion representative of a wearable item depicted within an image, according to one embodiment.

FIGS. 5A-5C depict converted patches representative of a wearable item depicted within an image, according to some embodiments.

FIG. 7A-7D depict power spectra according to some embodiments.

FIGS. 8A-8B depict a method of analyzing patterns according to some embodiments.

FIG. 9 depicts an exemplary method for analyzing a wearable item depicted in an image according to some embodiments.

DETAILED DESCRIPTION OF EMBODIMENTS

Figure 1:
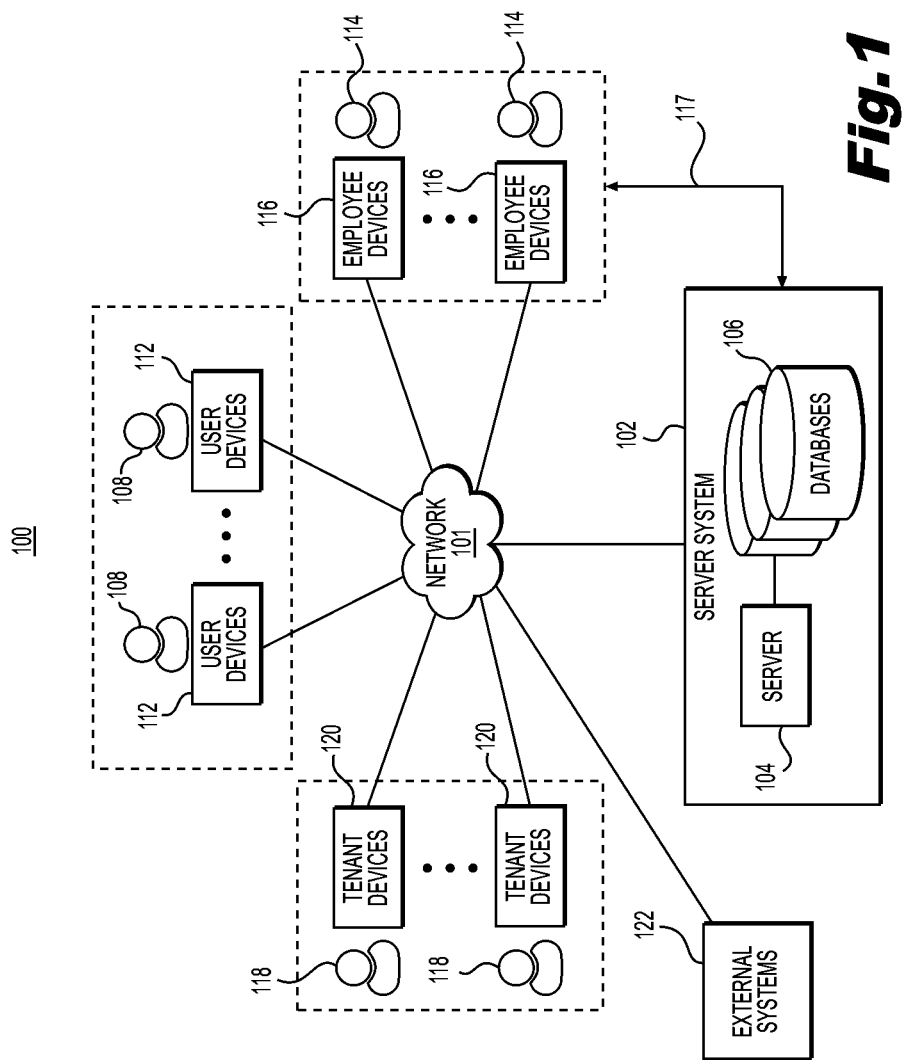
FIG. 1 depicts an example environment in which methods, systems, and other aspects of the present disclosure may be implemented.

As described above, conventional methods of wearable item image analysis typically employ neural network approaches (i.e., "deep learning"). As noted above, conventional methods for image processing using "deep learning" neural network approaches are suboptimal, especially in certain garment e-commerce, and other wearable item use cases. For example, such conventional methods are costly in terms of obtaining and utilizing input data and computational resources to train the algorithms for neural networks. Additionally, the neural network approach provides results in which the method and/or reasoning for the results are not transparent. The following embodiments describe systems and methods for analyzing images including a wearable item.

The following embodiments describe systems and methods for, among other uses, dynamically managing data associated with apparel or other wearable item subscriptions. As noted above, there exists a need to streamline an online subscription/retail servicing system and a process in which different user interfaces, computer-implemented services, and automations integrate together in a connected platform, in such a way that customer actions and back office tasks trigger each others' responsive actions in an efficient manner, while some back office tasks run in the background based on unique automation tasks and/or staff actions.

While the exemplary system architecture as described in the present disclosure relates to electronic transaction platform for subscribing to, purchasing, or renting wearable items (e.g., clothing-as-a-service (CaaS) or Try-Then-Buy (TTB) service), implementations disclosed herein may effectively serve various other online transaction platforms in the context of any other subscription, purchase, rental, or retail services without departing from the scope of the disclosure. In addition, while some descriptions and examples disclosed in the present disclosure refer to certain exemplary transaction platforms or inventories as transactions or inventories pertaining to "apparel," "garments," or "CaaS" (i.e., clothing-as-a-service), all of those transactions and/or inventories may effectively serve any wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing. As used herein, the term "closeting" or "to closet" may refer to a computer-implemented operation of placing one or more garments into a virtual closet (e.g., a cart, a repository, or any type of space which may be virtually associated with a particular set of one or more garments for a future transaction). Additionally, "matching" may refer to a computer-implemented operation of determining a set of one or more garments for allocating to a user and/or determining wearability metrics for given garments, and "allocating" or "allocation" may refer to a computer-implemented operation of determining the garments that should be assigned and shipped to one or more particular users.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

I. Pattern Analysis for Images for Electronic Transactions of Wearable Items

Referring now to the appended drawings, FIG. 1 shows an example environment 100, according to one or more embodiments of the present disclosure. As shown, the example environment 100 may include one or more networks 101 that interconnect a server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof.

Users 108 may access the server system 102 through the one or more networks 101 using user devices 112. Each device among the user devices 112 may be any type of computing device (e.g., personal computing device, mobile computing devices, etc.) which allows users 108 to display a web browser or a web-based application for accessing the server system 102 through the network 101. The user devices 112 may, for example, be configured to display a web browser, a web-based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription-based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web-based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandizer, or a brand owner entity that supplies one or more collections of wearable items to the CaaS inventory managed and/or accessed by the server system 102. Tenants 118 may use one or more electronic tenant interfaces (e.g., a catalog content management system associated with each tenant) to provide the server system 102 with wearable item data that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

The embodiments disclosed in further detail below may be used with respect to generating recommendations for customers. For example, customized recommendations for wearable items may be provided to a customer as the customer searches for a wearable item through the embodiments disclosed herein. The recommendations may be based on a similarity of the customer's preference to other customers' preferences or based on the wearable items the customer had previously showed an interest in and/or purchased. The analysis of colors and patterns of a wearable item depicted in an image as disclosed herein may provide attributes in order to find similar wearable items to recommend to the customer. In some embodiments, the image for analysis may be provided by a tenant and/or a customer.

Additionally, the embodiments disclosed in further detail below may be used with respect to forecasting style trends. For example, the information obtained using the color and pattern analysis as described herein may be utilized to provide predictions for further customer renting and buying trends. Such predictions may inform tenants regarding the purchase and/or availability of new inventory for rent and sale purposes.

Figure 2:
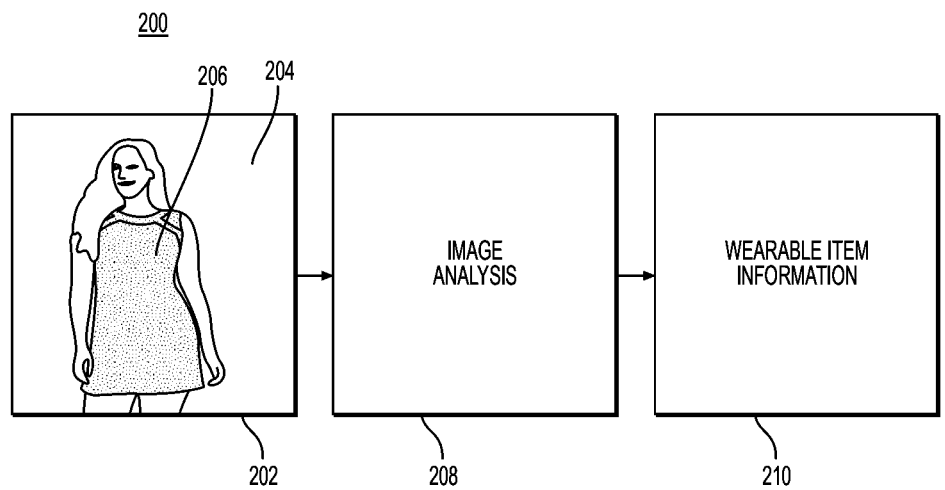
FIG. 2 depicts a process for analyzing a wearable item depicted in an image, according to some embodiments.

FIG. 2 depicts a diagram showing an exemplary process 200 for analyzing an image including a wearable item according to some embodiments. In some embodiments, the server system 102 may be configured to receive and perform an analysis of an image including a wearable item as shown in FIG. 2. In some embodiments, the server system 102 may perform the analysis based on a computer-implemented algorithm. As shown in step 202 of FIG. 2, the server system 102 may receive an image 204 including a wearable item 206. In some embodiments, the server system 102 receives a description of the wearable item, e.g., a type of the wearable item, with the image 204. In some embodiments, the image 204 may be received via one or more user devices 112, one or more employee devices 116, one or more tenant devices 120, and/or external system 122. Alternatively or additionally, one or more images 204 may be stored in databases 106 and/or received from any other third party in the clothing-as-a-service computing environment.

In step 208, the server system 102 may analyze the received image 204 of the wearable item 206 and determines aspects of one or more patterns and colors included in the wearable item 206. In some embodiments, aspects of the patterns include the widths and the orientations of each of the patterns of the wearable item 206. In some embodiments, aspects of the colors include the number of colors and the type of colors of the wearable item 206. For example, the type of colors may include any combination of hue, lightness, and saturation. Some examples of hue include 12 colors from a color wheel (e.g., yellow, yellow-green, green, blue-green, blue, blue-violet, violet, red-violet, red, red-orange, orange, and yellow-orange), as well as 3 achromatic colors (e.g., white, gray, and black). Some examples of saturation include achromatic, semi-saturated, and saturated. Some examples of lightness include dark, medium, and bright. In step 210, the server system 102 transmits information associated with the wearable item 206 (hereinafter referred to as wearable item information 210) based on the analysis performed in step 208. In some embodiments, the wearable item information comprises an analysis of one or more patterns of the wearable item 206. For example, the analysis of one or more patterns of the wearable item 206 may explain whether the wearable item 206 includes a pattern that is more solid or more patterned. As another example, the pattern analysis may include an orientation of one or more patterns of the wearable item 206. In some embodiments, the information 210 comprises an analysis of one or more colors of the wearable item 206. For example, the analysis of the one or more colors may include a number of colors and proportion of the colors of the wearable item 206. As another example, the analysis of the one or more colors may include color names and types, e.g., semi-saturated vs. saturated and bright vs. dark. In some embodiments, the information 210 comprises a description and/or classification of the wearable item 206.

In some embodiments, the image analysis step 208, as shown in and described with reference to FIG. 2, comprises three processes: (1) locating a patch portion representative of the wearable item 206; (2) analyzing one or more patterns of the wearable item 206; and (3) analyzing one or more colors of the wearable item 206. The three processes will be explained in further detail below.

FIGS. 3A-3B and 4A-4B depict processes for locating a patch portion representative of the wearable item 206 depicted within the image 204 according to some embodiments. In some embodiments, the image 204 includes a person wearing the wearable item 206 with the person facing forward and the entire wearable item 206 in view. The received image 204 including the wearable item 206 may be a high resolution garment production image. In some embodiments, the server system 102 may be configured to locate the patch portion representative of the wearable item 206 depicted within the image 204.

Figure 3A:
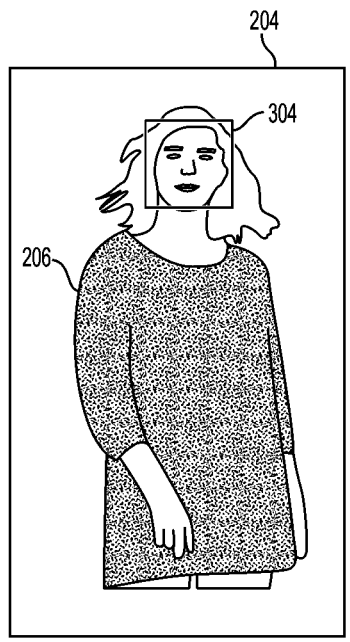
FIGS. 3A-3B depict a method of locating a patch portion representative of a wearable item depicted within an image, according to one embodiment.
Figure 3B:
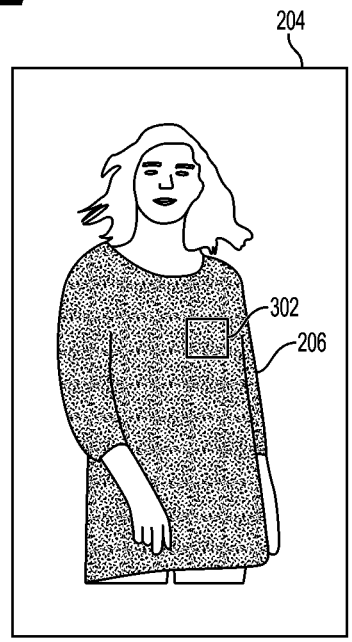

FIGS. 3A-3B depict a method of locating a patch 302 representative of the wearable item 206 depicted within the image 204 according to an embodiment. As shown in FIG. 3A, the server system 102 receives an image 204 depicting a model wearing a wearable item 206. The server system 102 then estimates the position and the width of a face (hereinafter referred to as the face portion 304) of the model within the received image. In some embodiments, a face finding algorithm is used to estimate the face portion 304 as shown in FIG. 3A. For example, the automated Haar Cascade face finding algorithm may be used to locate the face of the model. The patch 302 representative of the wearable item 206 may be determined by locating a portion within the image at a position relative to the position of the estimated face portion 304 as shown in FIG. 3B.

In some embodiments, the relative position of the patch 302 may be different based on the type of wearable item 206. For example, the relative position of the patch 302 for a pair of pants may be different from the relative position of the patch 302 for a skirt. In some embodiments, a rectangular filter is used to determine the face portion 304 and the patch 302. In some embodiments, a rectangular unit (hereinafter referred to as a face unit) based on the width and height of the face may be used to determine the relative position of the patch 302. For example, the patch 302 for a pair of pants may be located by moving four face units down from the bottom of the face portion 304 and a half face unit to the right of the center of the face portion 304 in order to avoid the zipper. In some embodiments, the width of the patch 302 may be determined based on a width of the face unit. For example, the width of the patch 302 may be configured as a half of a face unit.

FIGS. 4A-4B depict a method of locating a patch 302 representative of the wearable item 206 depicted within the image 204 according to an embodiment. As shown in FIG. 4A, the server system 102 receives an image 204 depicting a model wearing a wearable item 206. A silhouette 404 of the model wearing the wearable item 206 may be segmented and labelled as foreground relative to everything else in the image 204, which may be labelled as background, as shown in FIG. 4B. In some embodiments, a computerized algorithm, such as the Grabcut algorithm, may be utilized to segment, label, and use the silhouette 404. A center of the silhouette 404 may be located and the patch 302 may be determined based on a relative position to the center of the silhouette 404. For example, the patch 302 may be identified as a portion of the image 204 located a half face unit down and to the right of the center of the silhouette 404. In some embodiments, the face unit for this method of locating the patch 302 may be determined based on an average face width from previous image analyses.

In some embodiments, a face unit is determined based on the face portion 304 in the received image 204 as described above with reference to FIGS. 3A-3B. In other embodiments, the face unit is determined based on an average face width from previous image analyses as described above with reference to FIGS. 4A-4B. In some embodiments, a combination of different methods of face unit determination may be used. For example, the face unit may be determined based on the average face width from previous image analyses if the face finding algorithm fails to locate a face in an image and determine a face unit directly from the image. The width of the determined face unit is used as a unit distance for the width of the patch 302, and as a unit distance for the pattern analysis as described in further detail below.

FIGS. 5A-5C, 6A-6B, and 7A-7C depict processes for analyzing one or more patterns of the wearable item 206 according to some embodiments. In some embodiments, the server system 102 may be configured to perform an analysis of one or more patterns of the wearable item 206.

In some embodiments, the server system 102 obtains the image 204 and the coordinates of the patch 302 representative of the wearable item 206 depicted in the image 204 and performs a Fast Fourier Transform (FFT) of the patch 302. The FFT converts the patch 302 into components of sine waves of different widths, orientations, and phases. FIG. 5A shows various converted patches 505a-d including components of sine waves in varying widths according to some embodiments. As shown in FIG. 5A, converted patch 505a does not have any sine wave components while converted patch 505b has one sine wave component. Converted patch 505c has two sine wave components and converted patch 505d has four sine wave components. The different widths of the sine wave components indicate different frequencies and such widths are described as cycles per unit length. For example, converted patch 505a has zero cycles, converted patch 505b has one cycle, converted patch 505c has two cycles, and converted patch 505d has four cycles. In some embodiments, a face unit is used as the unit. Accordingly, the different frequencies included in the converted patch 505a-d may be indicated as cycles per face (cpf). In the context of image processing, frequencies indicate spatial frequencies. Referring back to FIG. 5A, converted patch 505a can be explained as having zero cpf, which indicates that the patch is of a solid color. Similarly, converted patch 505b has one cpf, which indicates a low spatial frequency and converted patch 505d has four cpf, which indicates a relatively higher spatial frequency. In some embodiments, zero to ten cpf may indicate a low spatial frequency, i.e., a relatively wide pattern, and ten to twenty cpf may indicate a high spatial frequency, i.e., a relatively narrow pattern.

Figure 5C:

FIG. 5B shows various converted patches 510a-d in varying orientations according to some embodiments. The various orientations of the converted patches 510a-d indicate a direction of the pattern. FIG. 5C shows converted patches 515a-b with varying phases according to some embodiments. A cycle for converted patch 515a may start with a relatively bright portion of the cycle as shown on the left side of the converted patch 515a. A cycle for converted patch 515b may start with a relatively dark portion of the cycle as shown on the left side of the converted patch 515b. As shown in FIG. 5C, the relatively bright portion of the cycle in converted patch 515b may have shifted by about a fourth of the cycle to the right from the relatively bright portion of the cycle in converted patch 515a. This shift may be referred to as a phase shift.

Figure 6A:
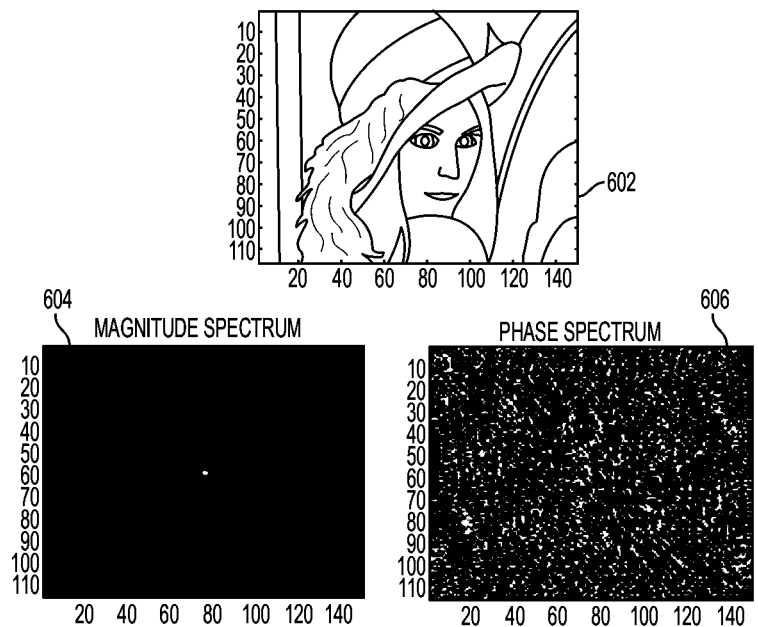
FIGS. 6A-6C depict a method of analyzing patterns of wearable items depicted within images, according to some embodiments.
Figure 6B:
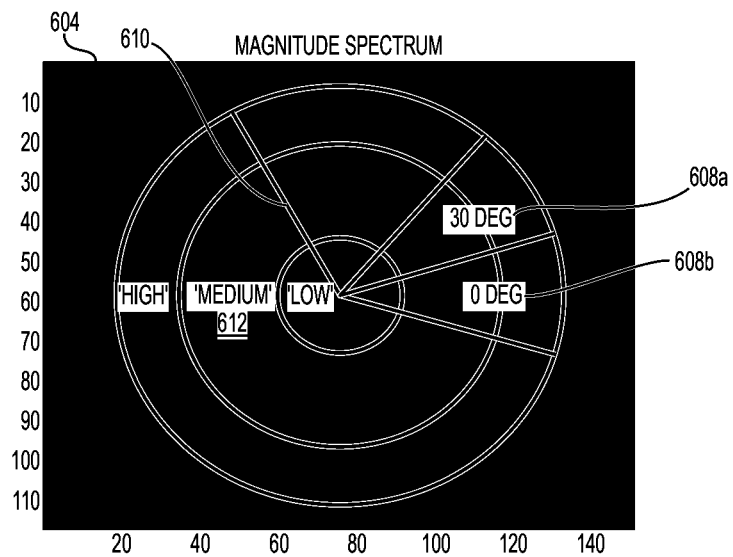

FIGS. 6A-6B show an example of a FFT of an image according to one embodiment. As shown in FIG. 6A, the FFT of an image 602 provides a two dimensional polar plot of a magnitude spectrum plot 604 and a two dimensional polar plot of a phase spectrum 606. The phase spectrum 606 may depict the horizontal shift (along an axis of orientation) of sinusoidal components comprising the FFT of the image 602 according to some embodiments. In some embodiments, the horizontal shift of the sinusoidal components may be used to determine positions of patterns in the image 602. The magnitude spectrum plot 604 depicts the power for separate components in terms of spatial frequency and orientation on a two dimensional polar plot. As shown in FIG. 6B, a distance from the center of the magnitude spectrum plot 604 indicates the spatial frequency. That is, the center of the magnitude spectrum plot 604 indicates zero spatial frequency and an increasing radius 610 from the center indicates increasing spatial frequency. For example, the further away from the center of the magnitude spectrum plot 604, the higher the spatial frequency. Accordingly, the center of the magnitude spectrum plot 604 may be indicated as 0 cpf. Additionally, each angle with an endpoint at the center of the magnitude spectrum plot 604 indicates an orientation. Such angles with endpoints may also be referred to as "orientation bands," which cover various orientation ranges, e.g., the 0 degree orientation band 608a with a 30 degree width ranging from −15 to 15 degrees and the 30 degree orientation band 608b with a 30 degree width ranging from 15 to 45 degrees.

In some embodiments, the magnitude spectrum plot of a patch portion representative of a wearable item depicted in an image may be used to derive a power spectrum. In some embodiments, there are two types of power spectrum: (1) a spatial frequency power spectrum, and (2) an orientation power spectrum.

Figure 7A:
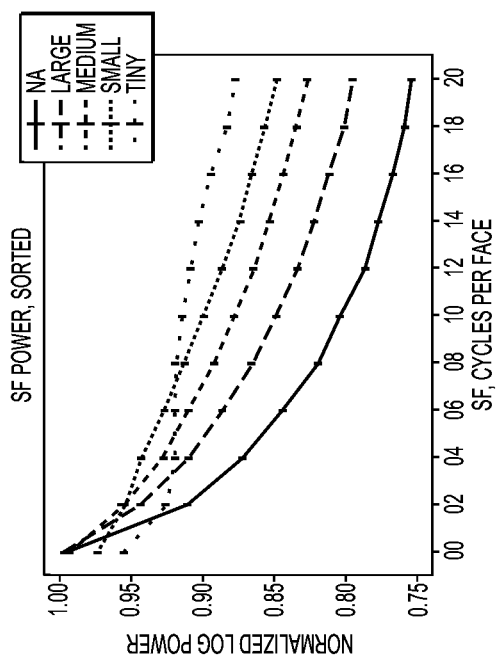

For the spatial frequency power spectrum, the power within a range of spatial frequencies, e.g., a 'medium' ring 612 covering a range of distances from the center of the magnitude spectrum plot 604, is summed to derive the power spectrum. For example, the magnitudes within the entire area of the medium ring 612 is first squared to find the power and then summed, which provides the power for the medium spatial frequency band. In some instances, the power across all spatial frequencies is log normalized. More specifically, the logarithm of power (also referred to as the log power) for each spatial frequency band is calculated. The log power is then normalized. That is, the log power is rescaled such that the maximum log power is equal to 1. FIG. 7A depicts an example of spatial frequency power spectra with spatial frequency bands of 2 cpf according to some embodiments. The power spectra depicted in FIG. 7A represents the power spectra for 3,000 wearable items grouped (by merchandising labels) for pattern scale. The N/A shown in FIG. 7A may indicate 'not applicable,' or a solid pattern. In some instances, the pattern scale, listed from largest to smallest, may be: N/A, large, medium, small, and tiny. As shown in FIG. 7A, the power spectra in aggregate are ordered according to each respective pattern scale label. As an example, for high spatial frequencies above 10 cpf, the 'tiny' labels may have the greatest 'amount' (i.e., greater magnitudes) of high spatial frequencies. The greatest amount of high spatial frequencies above 10 cpf are listed in decending order as follows: small, medium, large, and N/A.

Figure 6C:
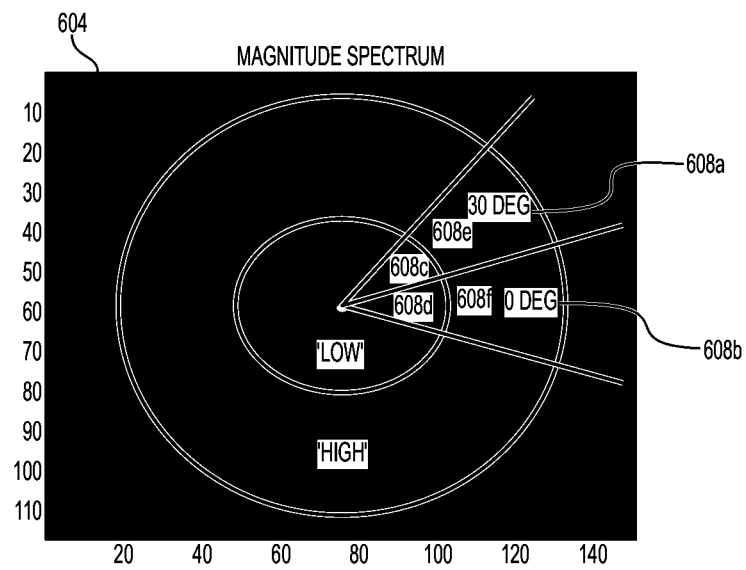

Referring now to the orientation power spectrum, the power within a certain orientation band, e.g., the 0 degree orientation band 608a or the 30 degree orientation band 608b, may be summed to derive the power spectrum. In some embodiments, there may be two types of orientation power spectra: (1) a power spectrum for lower spatial frequencies 608c-d, and (2) a power spectrum for high spatial frequencies 608e-f, as shown in FIG. 6C. As shown in FIG. 7B, the power spectrum for lower spatial frequencies may cover a range of 0 to 10 cpf (wide patterns) for several orientation bands, e.g., −60 degree orientation band, −30 orientation band, etc. As shown in FIG. 7C, the power spectrum for higher spatial frequencies may cover a range of 10 to 20 cpf (narrow patterns) for the several orientation bands. The 0 degree orientation band may indicate a horizontal orientation of a pattern and the 90 degree orientation band may indicate a vertical orientation of a pattern. FIGS. 7B-7C show the relative power of patterns at various orientations according to some embodiments. As shown in FIGS. 7B-7C, the spectra for the polka dots pattern is depicted as relatively flat. This is because the circular patterns that dictate polka dot patterns do not have a dominant orientation. Referring again to FIGS. 7B-7C, the relative amount for a plaid pattern tends to peak at the 0 degree orientation band (the horizontal orientation) and the 90 degree orientation band (the vertical orientation). This is because plaid patterns generally have a strong pattern of horizontal and vertical striping. In some embodiments, the spectra for striped pattern and non-classifiable patterns may also be provided as shown in FIGS. 7B-7C. FIG. 7D shows another example of orientation power spectra for wearable items of various garment types according to some embodiments. In some instances, the various garment types may be referred to as "garment personae." Based on the orientation spectra shown in FIG. 7D, it may be determined that an Ariana garment personae, a specific garment type, includes wearable items of more oblique or circular patterns, a Carly garment personae, another specific garment type, includes wearable items with horizontal and vertical stripes with relatively more horizontal stripes, a Megan EC garment personae, another specific garment type, includes wearable items with horizontal and vertical stripes with relatively more vertical stripes, and a Megan WC garment personae, yet another specific argment type, includes slightly more vertical patterns than the Ariana garment personae.

In some embodiments, the analysis of one or more patterns of the wearable item may output spatial frequency power spectra as shown in FIG. 7A with 0 to 20 cpf. In some embodiments, the analysis of one or more patterns of the wearable item may output orientation power spectra as shown in FIG. 7B from −60 degrees to 90 degrees in 30 degree orientation bands covering a range of spatial frequencies from 0 to 10. In some embodiments, the analysis of one or more patterns of the wearable item may output orientation power spectra as shown in FIG. 7C from −60 degrees to 90 degrees in 30 degree orientation bands covering a range of spatial frequencies from 10 to 20. As shown in FIGS. 7A-7D, all power spectra are first log transformed, then normalized so that the maximum is 1.

FIGS. 8A and 8B depict color analyses of the wearable item 206 according to some embodiments. In some embodiments, the server system 102 may be configured to perform an analysis of one or more colors of the wearable item 206. In one embodiment, the server system 102 obtains the image 204 and the coordinates of the patch 302 representative of the wearable item 206 depicted in the image 204. In the first step for the color analysis, the server system 102 may convert Red, Green, and Blue (RGB) values of each pixel within the patch 302 to Hue, Saturation, and Lightness (HSL) values.

In the second step for the color analysis, the server system 102 may estimate the number of colors in the patch 302 based on the converted HSL values. In some embodiments, a computer-implemented algorithm is used to search for clusters of HSL values to estimate the number of colors in the patch 302. In such embodiments, a k-means clustering may be used to obtain a range of cluster numbers for the patch 302. The general hypothesis behind the k-means clustering is that a single color will be represented across a number of pixels by a cluster of nearby HSL values. In some embodiments, the spread of HSL values may be due to variations caused by differences in illumination and orientation. The server system 102 then determines the number of clusters, i.e., the number of colors in the patch 302, based on two criteria: (1) threshold cluster distance; and (2) threshold root mean square error (RMSE). For determinations based on the threshold cluster distance, a cluster is rejected if a distance between a cluster center and a neighboring cluster center is below a predetermined threshold. The distance between cluster centers is a Euclidean distance in HSL coordinates. The threshold cluster distance imposes a closeness constraint on the colors in the patch 302. For determinations based on the threshold root mean squared error (RMSE), a cluster is rejected if the RMSE is larger than a predetermined RMSE threshold where the RMSE is measured for the entire patch 302 as the mean Euclidean distance from each pixel's closest cluster center in HSL space. The threshold RMSE prevents a cluster from having a spread too large. That is, the threshold RMSE prevents one cluster from representing more than one color. In some embodiments, a maximum number of clusters may be set for the k-means clustering. Each cluster represents a certain HSL value.

In the third step for the color analysis, the server system 102 categorizes each cluster based on the associated HSL value. Some exemplary categories for hue may include 12 colors from a color wheel (e.g., yellow, yellow-green, green, blue-green, blue, blue-violet, violet, red-violet, red, red-orange, orange, and yellow-orange), as well as 3 achromatic colors (e.g., white, gray, and black). Some exemplary categories for saturation may include achromatic, semi-saturated, and saturated. Some exemplary categories for lightness may include dark, medium, and bright.

In a fourth step for the color analysis, the server system 102 combines clusters that are categorized identically. For example, two clusters with the same color name, saturation category, and lightness category are considered to be the same color. In such embodiments, the new HSL value for the combined color is the simple Euclidean mean of the combined clusters.

In a fifth step for the color analysis, the server system 102 summarizes the color information for the patch 302 based on the categorized clusters in the previous steps, e.g., third and fourth steps. The summary may include the attributes: number of colors, proportion of achromatic, semi-saturated, and saturated colors, proportion of light, medium, and dark colors, and a color contrast. In some embodiments, the color contrast is determined as the average HSL Euclidean distance between the colors in the patch. In some embodiments, the summary may include the three dominant colors, i.e., the three most frequent colors, in the patch 302. In such embodiments, information regarding the three most dominant colors may include the hue name, saturation category, lightness category, and the proportion of the dominant color in the patch 302.

FIGS. 8A-8B show exemplary summaries for images as a result of a color analysis. FIGS. 8A-8B each shows an image 802, 808 including a wearable item and a patch 804, 810 representative of the wearable item. The color analysis summary 806, 812 lists the dominant colors of the wearable item in addition to the saturation, lightness, and proportion of each of the dominant colors. In some embodiments, the color analysis summary may include one or more of: total number of colors in the patch, proportion of achromatic colors in the patch, proportion of semi-saturated colors in the patch, proportion of saturated colors in the patch, proportion of dark colors in the patch, proportion of medium colors in the patch, proportion of bright colors in the patch, average color contrast of the patch measured in HSL Euclidean coordinates, hue name of the dominant (most frequent) color in the patch, saturation category of the dominant (most frequent) color in the patch, lightness category of the dominant (most frequent) color in the patch, proportion of the dominant (most frequent) color in the patch, hue name of the second (most frequent) color in the patch, saturation category of the second (most frequent) color in the patch, lightness category of the second (most frequent) color in the patch, proportion of the second (most frequent) color in the patch, hue name of the third (most frequent) color in the patch, saturation category of the third (most frequent) color in the patch, lightness category of the third (most frequent) color in the patch, and proportion of the third (most frequent) color in the patch.

FIG. 9 depicts an exemplary method 900 for performing color and pattern analysis of images including wearable items. The method 900 includes step 902, in which one or more processors (e.g., one or more processors of the server system 102) may receive an image depicting a wearable item. For example, as described above, server system 102 may receive one or more images of wearable items from any other devices within a clothing-as-a-service environment, or otherwise over the Internet. In step 904, the one or more processors may identify the wearable item within the image by identifying a face of an individual wearing the wearable item or segmenting a foreground silhouette of the wearable item from background image portions of the image. In step 906, the one or more processors may determine a portion of the wearable item identified within the image as being a patch portion representative of the wearable item depicted within the image. In step 908, the one or more processors may derive one or more patterns of the wearable item based on image analysis of the determined patch portion of the image. In step 910, the one or more processors may derive one or more colors of the wearable item based on image analysis of the determined patch portion of the image. In step 912, the one or more processors may transmit information regarding the derived one or more colors and information regarding the derived one or more patterns.

In some embodiments, determining the portion of the wearable item identified within the image as being the patch portion representative of the wearable item depicted within the image comprises locating a portion within the image at a predetermined distance and direction from the identified face of the individual wearing the wearable item; and determining the located portion within the image as the patch portion representative of the wearable item depicted within the image.

In some embodiments, determining the portion of the wearable item identified within the image as being the patch portion representative of the wearable item depicted within the image comprises locating a center portion of the segmented foreground silhouette of the wearable item; and determining the located center portion as the patch portion representative of the wearable item depicted within the image.

In some embodiments, a size of the patch portion representative of the wearable item depicted within the image is based on a size of the identified face of the individual wearing the wearable item.

In some embodiments, deriving the one or more patterns of the wearable item based on image analysis of the determined patch portion of the image performing a fast Fourier transform, FFT, of the determined patch portion of the image; and deriving at least one of an orientation and a width for each of the one or more patterns based on the FFT of the patch.

In some embodiments, deriving one or more colors of the wearable item based on image analysis of the determined patch portion of the image comprises converting the determined patch portion of the image from a Red, Green, Blue (RGB) color model to a Hue, Saturation, Lightness (HSL) color model; and estimating a number of colors included in the converted patch portion of the image.

In some embodiments, estimating the number of colors included in the converted patch portion of the image comprises determining one or more clusters of pixels included in the converted patch portion of the image, wherein a first cluster and a second cluster are separated by a predetermined distance threshold, and wherein each of the first cluster and the second cluster comprises pixels with a root mean square error (RMSE) smaller than a predetermined RMSE threshold.

In some embodiments, estimating the number of colors included in the converted patch portion of the image further comprises identifying a cluster center for each of the determined one or more clusters of pixels; classifying the identified cluster center for each of the determined one or more clusters of pixels into categorical values of hue, saturation, and lightness; and estimating the number of colors based on the classified one or more cluster centers.

In some embodiments, receiving the image depicting the wearable item comprises receiving the image depicting the wearable item from one or more of an electronic tenant interface and a user interface.

In some embodiments, the method 900 further includes the step of classifying the wearable item within the image based on one or more of the information regarding the derived one or more colors and the information regarding the derived one or more patterns.

II. Platform for Electronic Transactions of Wearable Items

Figure 10:
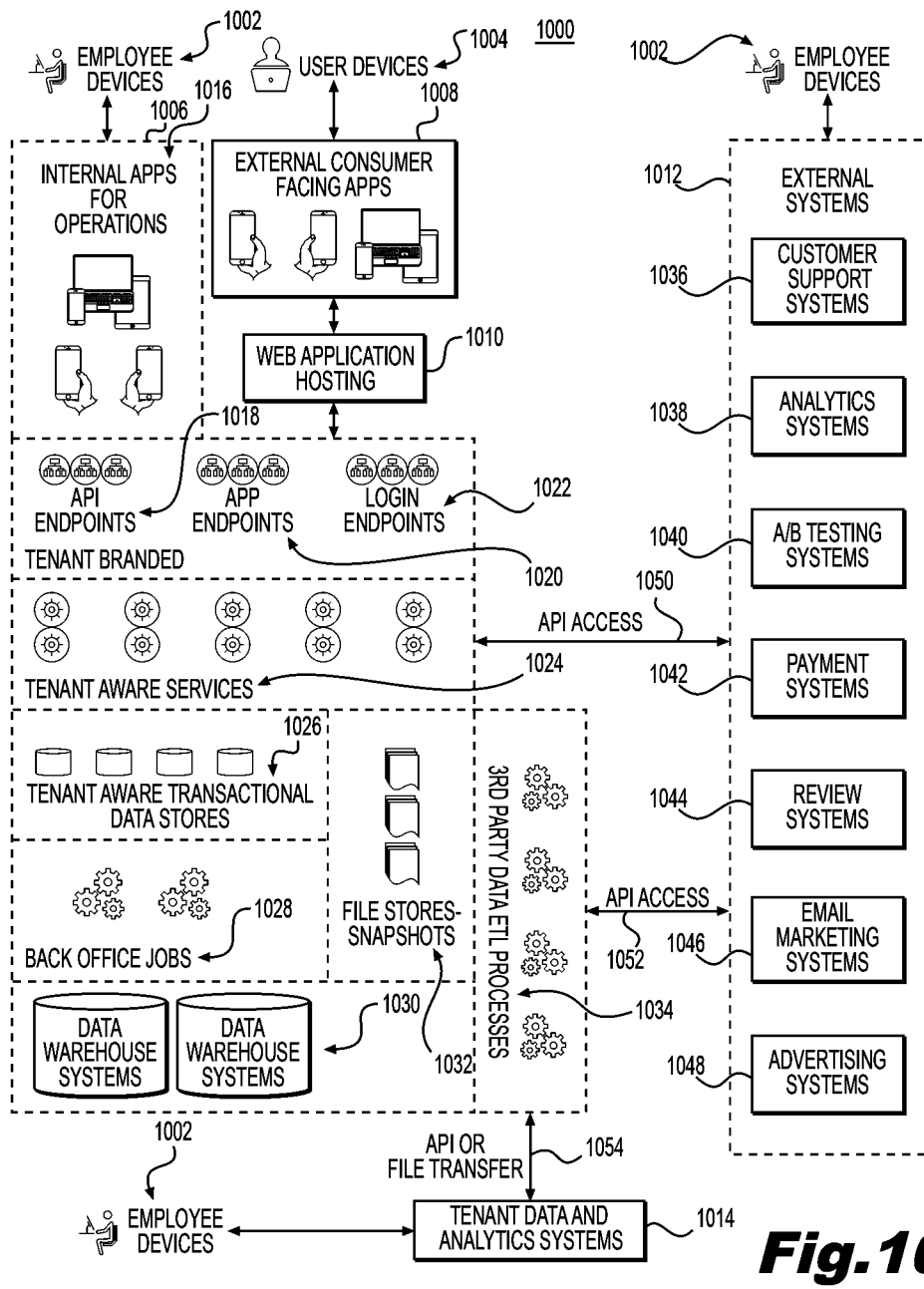
FIG. 10 depicts a schematic diagram depicting an architecture of an exemplary environment for a clothing-as-a-service electronic platform, according to one or more embodiments.

FIG. 10 depicts a schematic diagram of an exemplary architecture 1000 for a clothing-as-a-service electronic platform, according to one or more embodiments. The components of the architecture may be accessed by authorized terminals, such as employee devices 1002 and user devices 1004, over the one or more networks 101 or via any one or more other types of network (e.g., a cellular network, a public land mobile network, a local area network, a wide area network, a metropolitan area network, a telephone network, a private network, an ad hoc network, an intranet, the internet, a fiber optic based network, a cloud computing network, etc.). As used herein, the user devices 1004 may correspond to any one or more user devices 112 depicted in FIG. 1, and the employee devices 1002 may correspond to any one or more of the employee devices 116 and/or tenant devices 120 depicted in FIG. 1.

As shown in FIG. 10, in general, architecture 1000 may comprise an internal system 1006, external consumer facing apps 1008, a web application hosting server 1010, external systems 1012, and tenant data and analytics systems 1014. Internal system 1006 may comprise internal apps for operations 1016, API endpoints 1018, app endpoints 1020, login endpoints 1022, tenant aware services 1024, tenant aware transactional data stores 1026, back office jobs 1028, data warehouse systems 1030, file stores-snapshots 1032, and 3rd party data ETL processes 1034.

In operation, employee devices 1002 may access the internal system 1006, which may be stored at networked, distributed, and/or local systems (e.g., one or more virtual private clouds and/or one or more physical private networks). As used herein, a virtual private cloud may refer to a configurable pool of shared computing resources within a cloud environment, with groups of shared computing resources being allocated for a particular job(s), user(s) and/or a purpose(s). The outer boundary of the internal system 1006 depicted in dotted lines, encompassing all subcomponents 1016-1034, may represent a virtual private cloud allocated for hosting the entirety of the internal system 1006. Additionally, the inner boundaries within the internal system 1006, also depicted in dotted lines, may indicate multiple virtual private clouds (e.g., subsets of the larger virtual private cloud encompassing the internal system 1006), each allocated for one or more particular tasks, users, or purposes (e.g., tenant aware services 1024, back office jobs 1028, and data warehouse systems 1030).

The employee devices 1002 may communicate with the internal system 1006 through one or more internal apps 1016 comprising one or more web-based portals or user interfaces for operations. The one or more internal apps 1016 may be, for example, an electronic warehouse operations portal and/or an electronic administrative portal, as described in more detail below with respect to FIGS. 11 and 12. The one or more internal apps 1016 may include one or more web-based user interfaces, such as, for example, one or more mobile applications compatible with predetermined mobile device operating systems, a software application developed for desktop operating systems, and/or a web site configured for browser access to web pages via one or more networks (e.g., the Internet or an intranet). Employees 116 or tenants 118 may use employee devices 1002 to access the internal system 1006 and perform various CaaS functions related to warehouse operations and/or administrative tasks, as described in more detail below with respect to FIG. 11.

The internal system 1006 may also include Application Programming Interface ("API") endpoints 1018, APP (application) endpoints 1020, and login endpoints 1022. In some implementations, these endpoints may be hosted in a virtual private cloud or a physical private network with a preconfigured level of isolation from other virtual private clouds or physical private networks hosting different components of the internal system 1006. The API endpoints 1018 may be locations from which the APIs can access resources of the internal system 1006 that the APIs need to carry out their functions. For example, the API endpoints 1018 may specify where resources can be accessed by the APIs, while communicating with the APIs requesting information from the internal system 1006. Similarly, the APP endpoints 1020 may be the locations from which applications (e.g., applications in one or more internal apps 1016) may access resources of the internal system 1006 they need to carry out their functions, and the login endpoints 1022 may be the touchpoints of any communication pertaining to logins (e.g., authentication and access control) associated with the internal system 1006. For example, the login endpoints 1022 may receive and process login communications, for internal apps 1016 and/or external consumer facing applications 1008. For some implementations, at least some endpoints among the API endpoints 1018, APP endpoints 1020, and login endpoints 1022, may be tenant branded endpoints, designated to serve particular tenants 118.

The internal system 1006 may additionally include tenant aware services 1024 and tenant aware transactional data stores 1026. The tenant aware services may include microservices for fulfillment of various CaaS operations hosted in one or more virtual private clouds or one or more physical private networks. For example, the microservices may include, for example, catalog data, account data, data services, customer service functions, marketing functions, warehouse functions, and/or other supporting functions, as described in more detail below with respect to microservices 1156 depicted in FIG. 11. The tenant aware transactional data stores 1026 may be one or more databases that store both raw and processed data resulting from operations of the tenant aware services 1024, the endpoints 1018-1022, external systems 1012, and/or tenant data and analytics systems 1014. The tenant aware transactional data stores 1026 may store, for example, transactional data, batch jobs data, searchable data including various analytics and attributes, event messages, and local logs of various raw data. In some implementations, the tenant aware transactional data stores 1026 may correspond to some or all of the databases 1174-1182 depicted in FIG. 11.

The internal system 1006 may additionally include back office jobs 1028, which may comprise instructions, files, or executable applications configured to perform various back office tasks and/or computing resources to execute these instructions or applications. The back office jobs 1028 may be hosted in, for example, one or more virtual private clouds. The back office jobs 1028 may include, for example, all system components that run and update data (e.g., a first order data or any derived data) associated with the internal system 1006. Such system components may include, for example, replenishment identifier (RID) generation service(s), size advisor data set, size advisor algorithmic preparation component(s), recommendation service(s), search data sets, etc. The back office jobs 1028 may include, for example, ETL (extract, transform, and load) processes that comprise collecting data from multiple different sources (e.g., tenant aware transactional data stores 1026), converting the collected data to other one or more preset formats as deemed necessary, and loading the data into the target database (e.g., data warehouse systems 1030). The back office jobs 1028 may also include, for example, periodic data refresh operations, periodic synchronization states among internal and external services, and automated tasks to run in the background at the internal system 1006, as described in more detail below with respect to job execution cluster 1146 depicted in FIG. 11.

The internal system 1006 may include the file stores for snapshots 1032 in one or more virtual private clouds or one or more physical private networks. The file stores of snapshots 1032 may store snapshots capturing states of the internal system 1006 at particular points in time. For example, each snapshot may capture settings, files, configurations, and the memory state of the components of the internal system 1006. These snapshots may be restored upon request or scheduling, and when a snapshot is restored, settings, and/or the state of the internal system 1006 may be returned to the states they were in at the time the snapshots was captured.

The internal system 1006 may include third party data ETL processes 1034, which may collect data from different external sources (e.g., external systems 1012), convert the collected data to other one or more preset formats as deemed necessary, and load the data into one or more target databases (e.g., data warehouse systems 1030 and/or tenant data and analytics system 1014).

The internal system 1006 may include the data warehouse systems 1030 in one or more virtual private clouds or one or more physical private networks. As discussed above with respect to the back office jobs 1028 and the third party data ETL processes 1034, the data warehouse systems 1030 may be the one or more target databases for ETL processes that collect data from various sources (e.g., the external systems 1012 or the tenant aware transactional data stores 1026). The data warehouse systems 1030 may then utilize the collected data as, for example, parameters for business intelligence that reveals patterns, analytics, and insights for business decisions associated with the internal system 1006. Such utilization for business intelligence may, for example, occur when the data warehouse systems 1030 are used by one or more business reporting tools, as described in more detail below with respect to FIG. 11.

The exemplary environment 1000 may include tenant data and analytics systems 1014. The tenant data and analytics systems 1014 may be computing resources in communication with one or more components of the internal system 1006 in order to collect, store, and/or manage data and analytics associated with the one or more tenants 118. One or more of the tenant data and analytics systems 1014 may be located remotely from the internal system 1006 (e.g., at tenant servers). The tenant data and analytics systems 1014 may communicate with the components of the internal system 1006 using API access or file transfer link 1054 over one or more networks 101. For example, the tenant data and analytics systems 1014 may communicate with the API endpoints 1018 of the internal system 1006, or receive files from third party data ETL processes 1034. The tenant data and analytics systems 1014 may be accessed by employee devices 1002, which may correspond to employee devices 116 or the tenant devices 120 depicted in FIG. 1.

As shown in FIG. 10, the exemplary environment 1000 may also include user devices 1004, which may correspond to the user devices 112 depicted in FIG. 1. Users 108 of the CaaS electronic platform may use the user devices 1004 to access the internal system 1006, as recipients of the services provided by the components of the internal system 1006. For example, the users 108 of the user devices 1004 may be one or more registered subscribers who physically receive and wear the items that are distributed via the CaaS electronic platform. As shown in FIG. 10, user devices 1004 may access the internal system 1006 via external consumer facing applications 1008. The external consumer facing applications 1008 may be browser-accessed web pages or web-based applications that include web-based user interfaces accessible from one or more user devices 1004 over one or more networks (e.g., one or more networks 101).

In some implementations, the exemplary environment 1000 may include web application hosting server 1010 to serve as an intermediary for enabling communications made between the user devices 1004 and the internal system 1006. The web application hosting server may be an external (e.g. third party) server that provides an online platform for, for example, building a web-based storefront interface and integrating online retail components (e.g., online point-of-sale system) onto the storefront interface, for vendors such as the internal system 1006. The web application hosting server 1010 may communicate with the internal system 1006 (e.g., the API endpoints 1018, the APP endpoints 1020, and/or an employee device 1002 logged into the internal system 1006), to retrieve necessary information about the internal system 1006, and to generate or dynamically update an online storefront for the user devices 1004. The user devices 1004 may, in turn, access the online storefront generated or dynamically updated by the web application hosting server 1010, through the external consumer facing applications 1008. In this way, the external consumer facing applications 1008 may allow user devices 1004 to not only communicate with the internal system 1006, but also to communicate with external systems 1012. Such communication with the external systems 1012 may be enabled by use of the API access communication links 1050 and 1052 interconnecting the internal system 1006 and the external systems 1012. For example, the external consumer facing applications 1008 may access a platform in the customer support systems 1036 at external systems 1012, in order to allow a user 108 to submit a customer review or feedback.

The exemplary environment 1000 may additionally include external systems 1012 (e.g., systems corresponding to the external systems 122 depicted in FIG. 1), that may be accessed by employee devices 1002 (e.g., devices corresponding to employee devices 116 and/or the tenant devices 120 depicted in FIG. 1), and also by the internal system 1006 (e.g., the system corresponding to server system 102 depicted in FIG. 1). The employee devices 1002 may access the external systems 1012 over one or more networks, using, for example, web browser access or user interfaces included in one or more web-based application. Additionally, as shown in FIG. 10, the internal system 1003 may also access the external systems over the one or more networks, using, for example, API access processes 1050 and 1052.

The external systems 1012 may include, for example, customer support systems 1036, analytics systems 1038, A/B testing systems 1040, payment systems 1042, review systems 1044, email marketing systems 1046, and advertising systems 1048. The customer support systems 1036 may include cloud-based voice, contact center, video, mobile, and unified communications solutions provided by an external (e.g., third party) server. Additionally, or alternatively, the customer support systems 1036 may include a customer data platform hosted by an external (e.g., third party) server, at which a user may log in and engage in interactive customer support, targeted campaigns, live chat support, call center support, and web-based messaging. The customer support systems 1036 may be accessed by employee devices 1002 (e.g., a vendor of these solutions) to, for example, customize settings, data, and/or configurations.

The analytics systems 1038 may include one or more web analytics tools provided by an external (e.g., third party) server, that provides dashboards, logs, or reports pertaining to, for example, tracking and reporting website traffic for the vendor (e.g., employees 116). For example, an analytics tool may be configured to display poorly functioning pages, where visitors came from, how long the visitors stayed on the website, the visitors' geographical position, visitor segmentation information, sales activity and performance, and detailed information about current visitors. The analytics systems 1038 may be accessed by employee devices 1002 (e.g., a vendor of these solutions) to, for example, customize settings, data, and/or configurations, and utilize the analytics data for business intelligence.

A/B testing systems 1040 may include A/B testing tools for measuring and optimizing user experience by, for example, measuring subjects' response to variant A against variant B and determining which of the two variants is more effective. The A/B testing tool may be provided by an external (e.g., third party) server. In the context of the CaaS electronic platform provided by the internal system 206, the A/B testing systems 1040 may perform an A/B test on, for example, a closet interface with a virtual assistant and a closet interface without a virtual assistant. Results of the experimentations may be provided to employee devices 1002 (e.g., a vendor of these solutions) to, for example, utilize the results for business intelligence.

The payment systems 1042 may include online payment tools provided by an external (e.g., third party) server. For example, a payment tool may provide a cloud-based platform configured to accept payments from users online, or within the platform's mobile application in the users' devices (e.g., user devices 1004 and/or user devices 1012). A payment tool may also include, for example, payment processing components configured to process the accepted payments and/or attempted transactions, as well as an anti-fraud tool that detects fraudulent transactions using preset conditions and blocks the fraudulent transactions during the processing of the payment. The payment systems 1042 may be accessed by employee devices 1002 (e.g., a vendor of these solutions) to, for example, retrieve payments, customize settings, data, and/or configurations pertaining to user payments, and utilize payment analytics data for business intelligence.

The review systems 1044 may include user review receiving tools provided by an external (e.g., third party) server. For example, a user review receiving tool in the review systems 1044 may provide a platform for users to add reviews, ratings, and/or user generated content such as videos, to be published for display at the external consumer facing applications 1008. The review systems 1044 may be accessed by employee devices 1002 (e.g., a vendor of these tools) to, for example, import reviews for analytics and business intelligence, and/or customize settings and configurations.

The email marketing systems 1046 may include email marketing automation and analytics tools, provided by an external (e.g., third party) server. For example, an email marketing automation tool may maintain mailing lists and mailing schedules, and may modify email marketing messages based on what recipients read, click on, or forward. The email marketing systems 1046 may be accessed by employee devices 1002 (e.g., a vendor of these tools) to, for example, manage communication preferences, the content, and/or vendor subscription settings.

The advertising systems 1048 may include web-based advertisement platforms at external (e.g., third party) advertisement platform providers. For example, the advertisement platform providers may be social network platforms or search engines that may display advertisements associated with the CaaS electronic platform of the internal system 1006 at their own interfaces based on their users' keywords, behaviors, or historical transactions. The advertising systems 1048 may be accessed by employee devices 1002 (e.g., a vendor of these tools) to, for example, manage advertisement preferences, the content, and/or vendor subscription settings.

The number and arrangement of devices, components, and communication networks shown in FIG. 10 are provided as an example. In practice, there may be additional devices, components, and/or communication networks, fewer devices, components, and/or communication networks, different devices, components, and/or communication networks, or differently arranged devices, components, and/or communication networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

Figure 11:
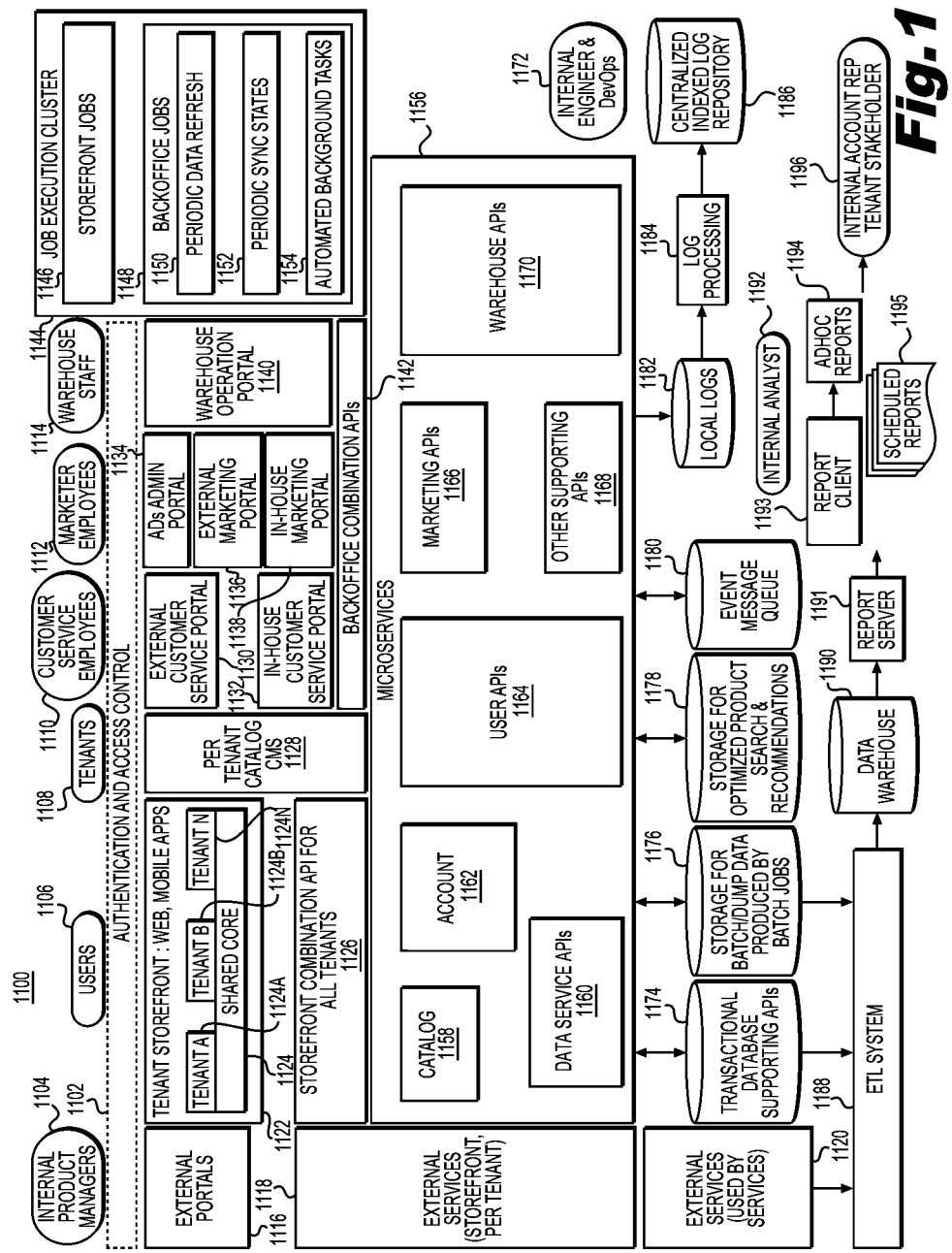
FIG. 11 depicts a schematic diagram depicting the architecture of an exemplary server system for a clothing-as-a-service electronic platform, according to one or more embodiments.

FIG. 11 depicts a diagram schematically showing the architecture an exemplary server system 1100 for a clothing-as-a-service electronic platform, according to one or more embodiments. The server system 1100 may correspond to the server system 102 depicted in FIG. 1, and to the internal system 1006 depicted in FIG. 10.

The server system 1100 may be accessed by a plurality of entities having different roles. For example, the server system 1100 may be accessed by various employees of the CaaS electronic platform, such as internal product managers 1104, customer service employees 1110, marketer employees 1112, and warehouse staff 1114. The server system 1100 may also be accessed by tenants 1108, such as entities that allocate and/or supply one or more specific collections of apparel for the CaaS inventories. For example, the tenants 1108 may correspond to tenants 118 depicted in FIG. 1. A tenant among the tenants 1108 may be a retailer, a designer, a manufacturer, a merchandizer, or a brand owner entity that supplies a set of apparel to the CaaS inventory managed and/or accessed by the server system 1100. Additionally, the server system 1100 may be accessed by users 1106. In some implementations, the users 1106 may correspond to users 108 depicted in FIG. 1, and users of user devices 1004 depicted in FIG. 10. Users 1106 may use their computing devices (e.g., user devices 1004) to access the server system 1100, as recipients of the CaaS electronic platform services provided by the components of the server system 1100. For example, the users 1106 may be one or more registered subscribers who physically receive and wear the apparel that are distributed via the CaaS operations. The users 1106 may log into the server system 1100 to initiate tasks associated with one or more CaaS operations, such as, for example, account management, catalog viewing, closeting items, providing return notifications, etc.

Entities 1104-1114 may each access the server system 1100 by communicating with an authentication and access control component 1102. The authentication and access control component 1102 may grant access to the server system 1100 only if the access requesting entity is successfully authenticated based on the access control conditions corresponding to the particular entity. The access control conditions, which may be stored in a memory in communication with the server 1100, may be applied to a particular entity based on various entity-specific factors, such as, for example, the authorized role(s) of each entity, the device being used by each entity, the portal sought to be accessed, and/or the geographic location of each entity.

At the server system 1100, one or more internal product managers 1104 may access external portals 1116. The external portals 1116 may be one or more portals (e.g., administrative user interface or vendor settings page) in connection with external (e.g., third party) services used by the server system 1100. For example, the server system 1100 may be in communication with a third-party service that provides web page analytics (e.g., as one of the analytics systems 1038). In order to configure vendor settings at this analytics service, one or more internal product managers 1104 may access the administrative user interface of this third-party web page analytics system as a vendor. Accordingly, the external portals 1116 may be in communication with the external servers hosting the external (e.g., third party) services, such as the external services 1118 and the external services 1120.

The external services 1118 may be services associated with tenant-specific storefronts, such as, for example, customer support services that may be provided at the tenant-specific storefronts, marketing and advertisement services that may bring users 1106 into the tenant-specific storefronts, content management systems for building and updating each tenant-specific storefront, and analytics services for tracking and reporting the performance of the tenant-specific storefronts.

The external services 1120 may be services used by the server system 1100 for all users (e.g., across different tenant-specific storefronts), such as, for example, accounting services, customer review receiving services, email notification services, and payment services. In some implementations, the communication between one or more internal product managers 1104 and external portals 1116 for communicating with external services 1118 and 1120, shown in FIG. 11, may correspond to the communication between the employee devices 1002 and the external systems 1012 as depicted in FIG. 10.

At the server system 1100, one or more users 1106 may access the tenant storefront 1122. The tenant storefront 1122 may include web-based user interfaces which may be implemented as, for example, web sites, one or more web-based applications, and/or one or more mobile device applications. As shown, the tenant storefront 1122 may include a different interface for each tenant, such as a storefront interface 1124A unique to tenant A, a storefront interface 1124B unique to tenant B, and a storefront interface 1124N unique to tenant N. While storefront interfaces 1124A-1124N may be unique to each tenant, all tenant-specific interface may include a shared core 1124 common to all tenants. In addition, the tenant storefront 1122 may communicate with other components of the server system 1100 (e.g., external services 1118, per tenant catalog CMS 1128, and/or microservices 1156) using storefront combination API 1126.

At the server system 1100, one or more tenants 1108 may access per tenant catalog content management system (CMS) 1128. The per tenant catalog CMS 1128 may comprise a portal that includes one or more user interfaces for communicating with tenants 1108 to create, modify, and/or update one or more apparel catalogs for the tenant storefront 1122 (e.g., catalogs in the storefront interface 1124A for tenant A). In some implementations, the per tenant catalog CMS 1128 may also be accessed by authorized employees associated with the server system 1100, such internal product managers 1104, marketer employees 1112, or warehouse staff 1114, to initiate or perform one or more functions associated with managing catalogs based on their respective roles.

Additionally, the per tenant catalog CMS 1128 may be in communication with the external services 1118. For example, a service among the external services 1118 may be a proprietary suite of online storefront management services, including subcomponents such as a storefront user interface building/updating tool and a dashboard for managing sales operations as orders, payments, and/or shipping. Accordingly, contents and data uploaded via the per tenant catalog CMS 1128 may be communicated to one or more of the external services 1118 for integration. Data maintained by one or more of the external services 1118 may also be communicated to the per tenant catalog CMS 1128 in order to, for example, allow tenants to view and/or evaluate. The communication between the per tenant catalog CMS 1128 and the external services 1118 may be performed by, for example, storefront combination API 1126, and/or data exchange over the one or more networks 101.

At the server system 1100, the one or more customer service employees 1110 may access an external customer service portal 1130 and/or an in-house customer service portal 1132. The one or more customer service employees 1110 authorized for such access may be one or more employees associated with the customer support services of the CaaS electronic platform of the server system 1100. The external customer service portal 1130 may be a portal for accessing one or more external components which may include, for example, various computer-implemented features such as interactive customer support, targeted campaigns, live chat support, call center support, and web-based messaging with users. In some implementations, the external customer service portal 1130 may correspond to the customer support systems 1036, being accessed by employee devices 1002, as depicted in FIG. 10. The in-house customer service portal 1132 may be a portal internally built into the server system 1100. The in-house customer service portal 1132 may include, for example, user interfaces for the one or more customer service employees 1110 to initiate, view, manage, and/or perform one or more of the microservices 1156 associated with customer support tasks.

At the server system 1100, the one or more marketer employees 1112 may access an ads administration portal 1134, an external marketing portal 1136, and an in-house marketing portal 1138. The one or more marketer employees 1112 authorized for such access may be one or more employees associated with marketing services of the CaaS electronic platform of the server system 1100. The ads administration portal 1134 may include one or more user interfaces at which one or more marketer employees 1112 may initiate, view, or manage administrative tasks related to advertisements. The ads administration portal 1134 may communicate with microservices 1156, including, for example, marketing APIs 1166, for exchanging data associated with campaign tracking, user segmentation, etc. The ads administration portal 1134 may also communicate with external services 1118, including, for example, external analytics services, external ads conversion tracking services, etc. The external marketing portal 1136 may be a portal for accessing one or more external components which may include, for example, various computer-implemented features such as marketing automation and analytics software for email, mobile, social and online marketing. In some implementations, the external marketing service portal 1136 may correspond to the email marketing systems 1046, being accessed by employee devices 1002, as depicted in FIG. 10. The in-house marketing portal 1138 may be a portal internally built into the server system 1100. The in-house marketing portal 1138 may be include, for example, user interfaces for the one or more marketer employees 1112 to initiate, view, or manage one or more microservices 1156 associated with marketing tasks such as campaign tracking, incentive management, user segmentation data, etc.

At the server system 1100, the warehouse staff 1114 may access a warehouse operation portal 1140. The warehouse staff 1114 authorized for such access may be one or more employees associated with warehouse operations of the CaaS electronic platform of the server system 1100. Accordingly, the warehouse portal 1140 may include one or more user interfaces at which warehouse staff 1114 may, for example, initiate, view, manage, enter data in, or perform administrative tasks related to warehouse operations. The warehouse portal 1140 may communicate with microservices 1156, including, for example, warehouse APIs 1170. Among the warehouse APIs 1170, service components that may communicate with the warehouse operation portal 1140 may be, for example, order processing, item photoshoot, inventory, inventory location, garment allocation, order fulfillment, shipping label management, package and shipment operations, return processing, laundry, and cycle count.

The external customer service portal 1130, the in-house customer service portal 1132, the ads administration portal 1134, the external marketing portal 1136, the in-house marketing portal 1138, and the warehouse operation portal 1140 may each communicate with various service components of the microservices 1142 and/or the external services 1118, via back office combination APIs 1142 and/or one or more networks 101. In some implementations, the back office combination APIs 1142 may correspond to API access communication links 1050, 1052, and/or 1054, depicted in FIG. 10. Additionally, in some implementations, the portals 1130-1140 may correspond to one or more internal apps 1016 and/or external systems 1012, depicted in FIG. 10.

Within the server system 1100, a group of hosts (e.g., computing resources) may form a job execution cluster 1144. The job execution cluster 1144 may utilize the combined computing power and shared resources of the hosts to process one or more jobs (e.g., workloads) of the server system 1100. The job execution cluster 1144 may, for example, dynamically allocate the combined computing power and the shared resources of the hosts, to perform one or more jobs associated with storefront or back office tasks. For a plurality of different jobs, the allocation of the computing power and the resources may be prioritized based on predetermined criteria, such as, for example, criticality, cost, time/order of receipt, and/or urgency.

The job execution cluster 1144 may be configured to execute storefront jobs 1146 and back office jobs 1148. Storefront jobs 1146 may configure the job execution cluster 1144 to perform background tasks triggered by actions of users 1106 at the tenant storefront 1122. For example, if a first user among the users 1106 initiated an order for one or more garment for shipment to the first user, the job execution cluster 1144 may execute a series of tasks under storefront jobs 1146, such as, calling the relevant APIs among the microservices 1156 (e.g., password login, size advisor, personalized discovery, recommendation, garment pricing, tax processing, IP location, address validation, order processing, shipment label, shipment tracking, fulfillment, package and shipment, etc.), storing transactional data resulting from the execution of the microservices into relevant data repositories among the databases 1174-1180, logging system events resulting from execution of microservices at local logs (e.g., storing at local logs 1182), and calling external service components (e.g., relevant service components from external services 1118 and/or 1120). Accordingly, storefront jobs 1146 may be performed on demand at the server system 1100, whenever a customer action is received at the tenant storefront 1122.

Back office jobs 1148 may configure the job execution cluster 1144 to perform tasks such as, but not limited to, periodic data refresh 1150, periodic synchronization states 1152, and automated background tasks 1154. In some implementations, back office jobs 1148 may correspond to back office jobs 1028 depicted in FIG. 10. The job execution cluster 1144 may execute jobs scheduled under periodic data refresh 1150, in accordance with one or more predetermined data refresh schedules. During each iteration of a job under periodic data refresh 1150, applicable variable data (e.g., metrics, scores, recommendation outputs, prices, etc.) stored in databases 1174-1180 may be refreshed based on the values of the input parameters captured at the time of execution. For example, periodic data refresh 1150 may refresh the values and/or data associated with matching and fulfillment operations, pricing, achievable service level (ASL) and item retirement, discovery and recommendation, and other data science jobs.

The job execution cluster 1144 may also execute one or more jobs scheduled under periodic synchronization states 1152. For example, a job under periodic synchronization states 1152 may synchronize states between the in-house service components (e.g., microservices 1156) and the external states (e.g., external services 1118 and 1120). Additionally, the job execution cluster 1144 may execute one or more jobs scheduled under automated background tasks 1154. One or more jobs under automated background tasks 1154 may be, for example, tasks triggered from portals 1130-1140 based on actions of employees 1110, 1112, and 1114. In some implementations, a job under automated background tasks 1154 may also be generated in response to an action of one or more tenants 1108 at the per tenant catalog CMS 1128.

The server system 1100 may include microservices 1156 that are available for deployment as APIs. In some implementations, microservices 1156 may correspond to the tenant aware services 1024 depicted in FIG. 10. Thus, the microservices 1156 may be services hosted at the virtual private clouds, as shown in FIG. 10. The microservices 1156 may include, for example, catalog 1158, data service APIs 1160, account 1162, customer APIs 1164, marketing APIs 1166, other supporting APIs 1168, and warehouse APIs 1170.

Catalog 1158 may include service components such as, for example, products (e.g., item attributes and identifiers), collections (e.g., groups of products), and/or size charts (e.g., size charts specific to tenants 1108, or canonical sizes set internally for server system 1100).

Data service APIs 1160 may include service components such as, for example, size advisor (e.g., service to advise recommended size(s) for a particular user for a garment, based on data associated with the user and the garment), personalized discovery (e.g., personized service indicating results of discovery for a particular user), recommendation (e.g., recommendation of garments for a user according to what she may like, recommendation of similar garments to a product the user is interested in, recommendation of garments that other users liked who have had similar experiences to the user, or recommendation of the user's returned favorite(s) for the user to buy), garment pricing (e.g., a pricing engine for each garment or for each order), and/or a user profile (e.g., services for generating, updating, or viewing user profile(s)).

Account 1162 may include service components such as, for example, new account creation, password login, social network login, password reset, single sign-on function(s), and/or session renewal function(s).

Customer APIs 1164 may include service components such as, for example, user information management for users 1106, subscription (e.g., settings, preferences, or subscription choices of users 306), size profile (e.g., creating or managing size profile information for a particular user), closet (e.g., placing one or more garments into a virtual closet), shipment tracking, at home garments (e.g., viewing or managing garments currently marked as at home), garments transaction (e.g., rental, purchase, or return transactions one or more garments), return notification (e.g., an interface configured to receive from users 1106 notification(s) to return item(s)), feedback (e.g., an interface configured to receive from users 1106 feedback regarding specific transactions, services, item sizes, etc.), product review (e.g., an interface configured to receive from users 1106 review of specific items), history, referral (e.g., users 1106 referring other potential users), and/or gift subscription (e.g., subscribing one or more users 1106 based on a gift balance).

Marketing APIs 1166 may include service components such as, for example, campaign tracking (e.g., monitoring or evaluating advertisements and/or marketing analytics), incentive management (e.g., data associated with dynamically managed incentives for users 1106 joining or performing any other incentivized activity), and/or user segmentation (e.g., data associated with users segmented for marketing purposes).

Other supporting APIs 1168 may include service components such as, for example, tax (e.g., tax computations for transactions), IP location (e.g., locating users 1106 based on Internet Protocol address of user devices 1004), and/or address validation (e.g., validating mailing addresses of users 1106 during transactions).

Warehouse APIs 1170 may include service components such as, for example, order processing, photoshoot (e.g., capturing electronic images of items being made available for rental or purchase transactions), inventory (e.g., computer-implemented functions associated with inventory management of items to be rented or purchased), inventory location (e.g., locating item in an inventory at a warehouse), garment allocation (e.g., allocating certain items for shipment to a particular user), fulfillment (e.g., fulfilling initiated orders), shipping label (e.g., generating, modifying, or outputting shipping labels), package and shipment (e.g., computer-implemented functions associated with packaging, sorting, and/or delivering the shipments out to users 1106), return processing (e.g., processing return items that have been received at a warehouse), laundry (e.g., computer-implemented functions associated with performing laundry of the returned items), and/or cycle count (e.g., computer-implemented functions associated with counting cycles that each wearable item have gone through).

At the server system 1100, the microservices 1156 may be in communication with a plurality of databases, including, for example, transactional database 1174, storage for batch/dump data 1176, storage for optimized product search and recommendations 1178, event message queue 1180, and local logs 1182. The transactional database 1174 may include data repositories dynamically updated based on user transactions, such as, for example, product OLTP (online transaction processing) database and/or business intelligence database. In some implementations, the transactional database 1174 may support API communications with microservices 1156 and/or the tenant storefront 1122, in order to exchange transactional data.

The storage for batch/dump data 1176 may be a database which stores data produced by batch jobs executed at the server system 1100. For example, the storage for batch/dump data 1176 may store a batch of replenishment identifiers periodically output by a service component associated with item replenishment (e.g., return processing component at the warehouse APIs 1170), or a batch of match setup files periodically output by matching setup engines (e.g., a back office job of server system 1100 which periodically matches wearability metrics to each data pair of a user identifier and an item identifier). In some implementations, when a first process produces a batch data and stores them at the batch/dump data 1176, a second process may be scheduled to retrieve the batch data later for a subsequent use.

The storage for optimized product search and recommendations 1178 may include data management components and/or databases such as, for example, Elasticsearch, Hbase, or any other types of data search/storage components capable of indexing, retrieving, and/or searching documents, or functioning as key-value-pair stores. For example, the storage for optimized product search and recommendations 1178 may be used to store and index data sets produced by an "offline" processes (e.g., processes that run independently of periodically executed back office jobs), and make those stored data sets available for specific retrieval requests (e.g., requests including specific queries).

The event message queue 1180 may be a database in communication with the microservices 1156, and it may serve as a message broker for event messages occurring between different components within the server system 1100. For example, the event message queue 1180 may store various event messages received from one or more components, until a receiving component connects and takes an event message off the queue. Accordingly, the event message queue 1180 may be a database used as a tool for distributing messages to multiple recipient components, and effectively and quickly balancing loads between components.

The local logs 1182 may be in communication with the microservices 1156. The local logs 1182 may be one or more databases that records system events associated with the microservices 1156. In some implementations, the local logs 1182 may be configured in such a way that all system events are recorded. Alternatively, the local logs 1182 may be configured with preset conditions dictating which system events are to be recorded.

The local logs 1182 may be in communication with a log processing engine 1184. The log processing engine 1184 may function as an intermediary data processing engine between the local logs 1182 and a centralized indexed log repository 1186. For example, the log processing engine 1184 may collect data from the local logs 1182, transform and/or rearrange the data in a predetermined format (e.g., based on a preset rule for conditionally deciphering, eliminating, deriving, or converting certain types of data), and converge such data into the centralized indexed log repository 1186. The centralized indexed log repository 1186 may be accessed by one or more internal engineers and/or one or more DevOps processes led by one or more internal engineers.

At the server system 1100, an ETL system 1188 may extract, transform, and load various data outputs into a data warehouse 1190, so that the data warehouse 1190 may serve as a unified source of data that are used for business intelligence or business analytics. For example, the ETL system 1188 may collect data from multiple different sources (e.g., data stores from external services 1120, transactional database 1174, and storage for batch/dump data 1176), convert the collected data to preset formats, and load the data into the data warehouse systems 1190. In some implementations, the data warehouse 1190 may correspond to the data warehouse systems 1030 depicted in FIG. 10.

As shown in FIG. 11, the data warehouse 1190 may be in communication with a report server 1191. The report server 1191 may be an external (e.g., third party) data visualization engine which may be configured to collect data from data warehouse 1190 and generate reports focused on business intelligence and analytics. Reports may be scheduled and/or automated with preconfigured settings (e.g., applicable time periods, input parameters, output metrics, output format, etc.), to produce scheduled reports 1195. Additionally, or alternatively, ad hoc requests may be received from one or more internal analysts 1192 of the CaaS electronic platform via one or more report client applications 1193 at an employee device (e.g., employee device 116), and the report server 1191 may respond to those ad hoc requests by generating and communicating ad hoc reports 1194 via the report client applications 1193. In addition to the one or more internal analysts 1192, other employees authorized to view and analyze reports, such as internal account representatives and tenant stakeholders 1196, may access the scheduled reports 1195 and/or ad hoc reports 1194.

The number and arrangement of devices, components, and communication networks shown in FIG. 11 are provided as an example. In practice, there may be additional devices, components, and/or communication networks, fewer devices, components, and/or communication networks, different devices, components, and/or communication networks, or differently arranged devices, components, and/or communication networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) associated with the server system 1100 may perform one or more functions described as being performed by another set of devices associated with the server system 1100.

Figure 12:
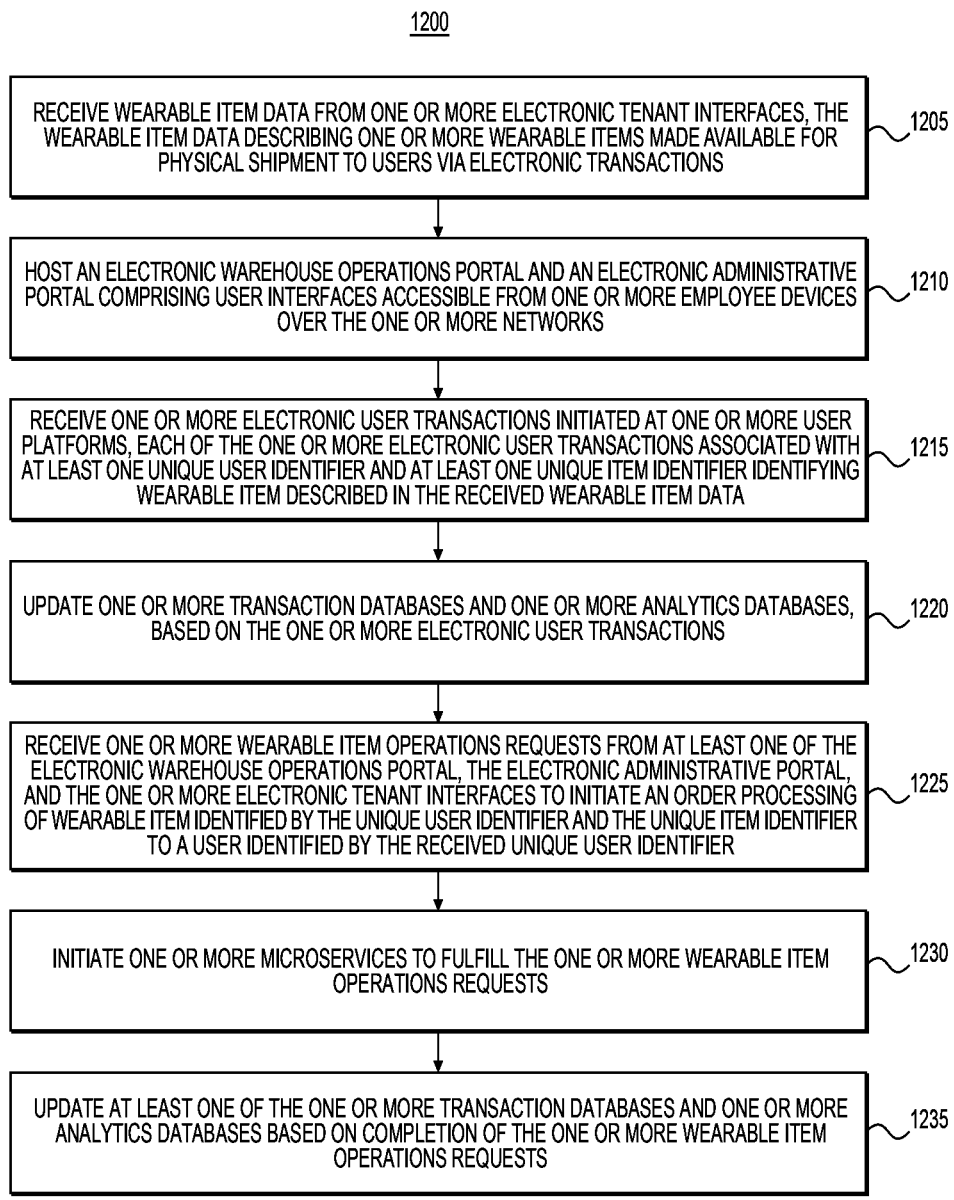
FIG. 12 depicts an exemplary method for dynamically managing data associated with transactions of wearable items, according to one or more embodiments.

FIG. 12 depicts an exemplary method 1200 for dynamically managing data associated with transactions of wearable items, according to one or more embodiments. As shown in the exemplary method 1200, the server system (e.g., the server system 102 or the server system 1100) may first receive wearable item data from one or more electronic tenant interfaces (e.g., per tenant catalog CMS 1128 or internal apps 1016), the wearable item data describing one or more wearable items made available for physical shipment to users via electronic transactions, wherein the one or more electronic tenant interfaces comprise one or more web-based user interfaces accessible from one or more tenant devices (e.g., tenant devices 120 or employee devices 1002) over one or more networks (Step 1205).

Additionally, the server system (e.g., the server system 102 or the server system 1100) may host an electronic warehouse operations portal (e.g., the warehouse operation portal 1140) and an electronic administrative portal (e.g., the external portals 1116, the external customer service portal 1130, the in-house customer service portal 1132, the ads administration portal 1134, the external marketing portal 1136, or the in-house marketing portal 1138), the electronic warehouse operations portal and electronic administrative portal comprising web-based user interfaces (e.g., the internal apps 1016) accessible from one or more employee devices (e.g., the employee devices 116 or the employee devices 1002) or over the one or more networks (Step 1210).

The server system (e.g., the server system 102 or the server system 1100) may receive one or more electronic user transactions initiated at one or more user platforms (e.g., the tenant storefront 1122), each of the one or more electronic user transactions associated with at least one unique user identifier and at least one unique item identifier identifying wearable item described in the received wearable item data, wherein the one or more user platforms comprise one or more user interfaces (e.g., the external consumer facing applications 1008, or any web-based user interfaces) accessible from one or more user devices (e.g., the user devices 112 or the user devices 1004) over the one or more networks (Step 1215). The one or more electronic user transactions may comprise, for example, an order placement, an order tracking, and/or return notification. In the process of receiving the one or more electronic user transactions, the server system may receive data from one or more external systems (e.g., the external systems 1012 or the external services 1118 and 1120), using one or more APIs, at the one or more web-based user interfaces of the one or more user platforms. The one or more APIs may comprise, for example, a payment API, a customer API, and/or an advertisement API.

In response to receiving the one or more electronic user transactions, the server system (e.g., the server system 102 or the server system 1100) may update one or more transaction databases (e.g., the transactional database 1174, the storage for batch/dump data 1176, the event message queue 1180, or the local logs 1182) and one or more analytics databases (e.g., the storage for batch/dump data 1176 or the storage for optimized product search and recommendations 1178), based on the one or more electronic user transactions (Step 1220).

The server system (e.g., the server system 102 or the server system 1100) may also receive one or more wearable item operations requests from at least one of the electronic warehouse operations portal (e.g., the warehouse operation portal 1140), the electronic administrative portal (e.g., the external portals 1116, the external customer service portal 1130, the in-house customer service portal 1132, the ads administration portal 1134, the external marketing portal 1136, or the in-house marketing portal 1138), and the one or more electronic tenant interfaces (e.g., per tenant catalog CMS 1128 or internal apps 1016) to initiate order processing of a wearable item identified by the unique user identifier and the unique item identifier for a user identified by the received unique user identifier (Step 1225).

In response to receiving the one or more wearable item operations requests, the server system (e.g., the server system 102 or the server system 1100) may initiate one or more microservices (e.g., the microservices 1156) to fulfill the one or more wearable item operations requests (Step 1230). The microservices may comprise, for example, order processing, inventory location, garment allocation, fulfillment, and return processing.

Additionally, the server system (e.g., the server system 102 or the server system 1100) may update at least one of the one or more transaction databases and one or more analytics databases based on completion of the one or more wearable item operations requests (Step 1235). The server system may then consolidate data from the one or more transaction databases, the one or more analytics databases, and one or more external systems, into one or more data warehouse systems (e.g., the data warehouse systems 1030 or the data warehouse 1190). Based on the consolidated data, the server system may also generate one or more of an ad hoc report (e.g., the ad hoc reports 1194) and a scheduled report (e.g., the scheduled reports 1195), for entities such as internal analyst 1192 or internal account representative and tenant stakeholder 1196.

Although FIG. 12 shows example blocks of an exemplary method 1200, in some implementations, the exemplary method 1200 may include additional blocks, fewer blocks, different blocks, or differently arranged blocks than those depicted in FIG. 12. Additionally, or alternatively, two or more of the blocks of the exemplary method 1200 may be performed in parallel.

Figure 13:
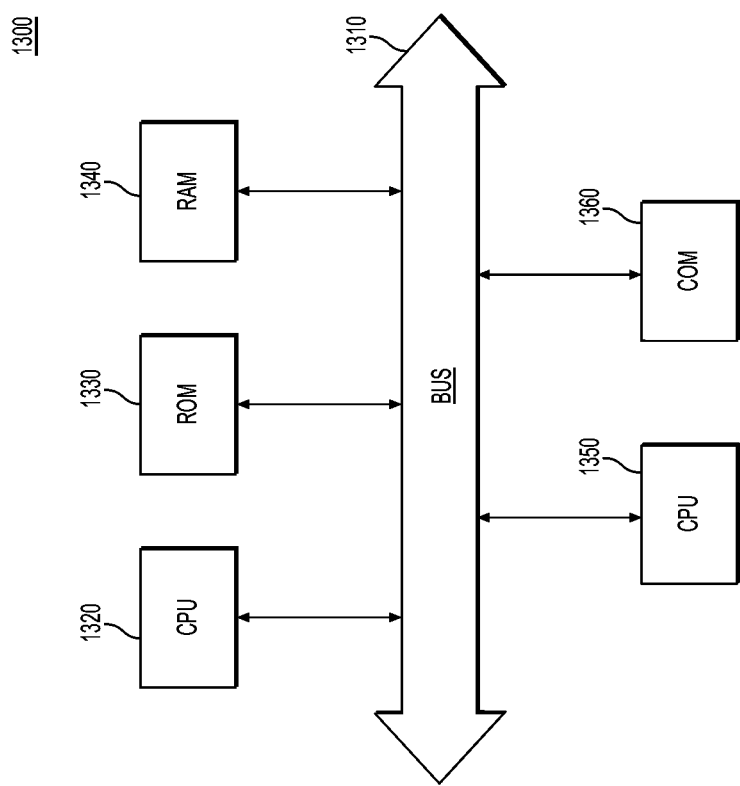
FIG. 13 depicts an exemplary computer device or system, in which embodiments of the present disclosure, or portions thereof, may be implemented.

FIG. 13 depicts an exemplary computer device or system, in which embodiments of the present disclosure, or portions thereof, may be implemented. In some implementations, the server system 102, the user devices 112, the employee devices 116, the tenant devices 120, the employee devices 1002, the user devices 1004, the internal system 1006, the external systems 1012, the server system 1100, and/or any other computer system or user terminal for performing the various embodiments of the present disclosure, may correspond to device 1300. Additionally, each of the exemplary computer servers, databases, user interfaces, modules, and methods described above can be implemented in device 1300 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-12, may be implemented using a processor device 1300. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 13, a device 1300 used for performing the various embodiments of the present disclosure (e.g., the server system 102, the user devices 112, the employee devices 116, the tenant devices 120, the employee devices 1002, the user devices 1004, the internal system 1006, the external systems 1012, the server system 1100, and/or any other computer system or user terminal for performing the various embodiments of the present disclosure) may include a central processing unit (CPU) 1320. CPU 1320 may be any type of processor device including, for example, any type of special purpose or a general-purpose microprocessor device. As will be appreciated by persons skilled in the relevant art, CPU 1320 also may be a single processor in a multi-core/multiprocessor system, such system operating alone, or in a cluster of computing devices operating in a cluster or server farm. CPU 1320 may be connected to a data communication infrastructure 1310, for example, a bus, message queue, network, or multi-core message-passing scheme.

A device 1300 (e.g., the server system 102, the user devices 112, the employee devices 116, the tenant devices 120, the employee devices 1002, the user devices 1004, the internal system 1006, the external systems 1012, the server system 1100, and/or any other computer system or user terminal for performing the various embodiments of the present disclosure) may also include a main memory 1340, for example, random access memory (RAM), and may also include a secondary memory 1330. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1330 may include other similar means for allowing computer programs or other instructions to be loaded into device 1300. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1300.

A device 1300 may also include a communications interface ("COM") 1360. Communications interface 1360 allows software and data to be transferred between device 1300 and external devices. Communications interface 1360 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 1360. These signals may be provided to communications interface 1360 via a communications path of device 1300, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. A device 1300 also may include input and output ports 1350 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for dynamically managing data associated with electronic transactions of wearable items, the method comprising:
   receiving, by one or more processors, wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks;
   hosting, by the one or more processors, an electronic warehouse operations portal and/or an electronic administrative portal, the electronic warehouse operations portal and/or electronic administrative portal comprising user interfaces accessible from one or more employee devices over the one or more networks;
   receiving, by the one or more processors, one or more electronic user transactions initiated at one or more user platforms, each of the one or more electronic user transactions associated with at least one unique user identifier and at least one unique item identifier identifying a wearable item described in the received wearable item data to be placed in a virtual closet and rented according to a subscription, wherein the one or more user platforms comprise one or more user interfaces accessible from one or more user devices over the one or more networks;
   receiving, by the one or more processors, one or more wearable item operations requests from at least one of the electronic warehouse operations portal, the electronic administrative portal, and the one or more electronic tenant interfaces to initiate order processing of the wearable item identified by the unique user identifier and the unique item identifier for a user identified by the received unique user identifier;
   in response to receiving the one or more wearable item operations requests, initiating one or more microservices to fulfill the one or more wearable item operations requests; and
   in response to receiving the one or more electronic user transactions and the one or more wearable item operations requests, updating, by the one or more processors, one or more transaction databases and one or more analytics databases, based on the one or more electronic user transactions to initiate shipping of the wearable item to the user at a physical address.

2. The method of claim 1, wherein the one or more electronic user transactions comprise at least one of an order placement, an order tracking, and a return notification.

3. The method of claim 1, wherein the one or more microservices comprise at least one of order processing, inventory location, garment allocation, fulfillment, and return processing.

4. The method of claim 1, further comprising consolidating, by the one or more processors, data from the one or more transaction databases, the one or more analytics databases, and one or more external systems, into one or more data warehouse systems.

5. The method of claim 4, further comprising generating, by the one or more processors, one or more of an ad hoc report and a scheduled report, based on the consolidated data in the one or more data warehouse systems.

6. The method of claim 1, further comprising receiving data from one or more external systems, using one or more application programming interfaces (APIs), at the one or more user interfaces of the one or more user platforms.

7. The method of claim 6, wherein the one or more application programming interfaces (APIs) comprise at least one of a payment API, a customer service API, and an advertisement API.

8. A computer system dynamically managing data associated with transactions of wearable items, the computer system comprising:
   a memory having processor-readable instructions stored therein; and
   at least one processor configured to access the memory and execute the processor-readable instructions, which when executed by the at least one processor configures the at least one processor to perform a plurality of functions, including functions for:
      receiving wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks;
      hosting an electronic warehouse operations portal and/or an electronic administrative portal, the electronic warehouse operations portal and electronic administrative portal comprising user interfaces accessible from one or more employee devices over the one or more networks;
      receiving one or more electronic user transactions initiated at one or more user platforms, each of the one or more electronic user transactions associated with at least one unique user identifier and at least one unique item identifier identifying a wearable item described in the received wearable item data to be placed in a virtual closet and rented according to a subscription, wherein the one or more user platforms comprise one or more user interfaces accessible from one or more user devices over the one or more networks;
      receiving one or more wearable item operations requests from at least one of the electronic warehouse operations portal, the electronic administrative portal, and the one or more electronic tenant interfaces to initiate order processing of the wearable item identified by the unique user identifier and the unique item identifier for a user identified by the received unique user identifier;

in response to receiving the one or more wearable item operations requests, initiating one or more microservices to fulfill the one or more wearable item operations requests; and in response to receiving the one or more electronic user transactions and the one or more wearable item operations requests, updating one or more transaction databases and one or more analytics databases, based on the one or more electronic user transactions to initiate shipping of the wearable item to the user at a physical address.

9. The system of claim 8,
wherein the one or more electronic user transactions comprise at least one of an order placement, an order tracking, and a return notification.

10. The system of claim 8, wherein the one or more microservices comprise at least one of order processing, inventory location, garment allocation, fulfillment, and return processing.

11. The system of claim 8, wherein the plurality of functions further comprise:
consolidating, by the at least one processor, data from the one or more transaction databases, the one or more analytics databases, and one or more external systems, into one or more data warehouse systems.

12. The system of claim 11, wherein the plurality of functions further comprise:
generating, by the at least one processor, one or more of an ad hoc report and a scheduled report, based on the consolidated data in the one or more data warehouse systems.

13. The system of claim 8, wherein the plurality of functions further comprise:
receiving data from one or more external systems, using one or more application programming interfaces (APIs), at the one or more user interfaces of the one or more user platforms.

14. The system of claim 13, wherein the one or more application programming interfaces (APIs) comprise at least one of a payment API, a customer service API, and an advertisement API.

15. A non-transitory computer-readable medium containing instructions for dynamically managing data associated with transactions of wearable items, the instructions when executed by a processor causing the processor to perform steps comprising:
receiving wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks;

hosting an electronic warehouse operations portal and/or an electronic administrative portal, the electronic warehouse operations portal and/or electronic administrative portal comprising user interfaces accessible from one or more employee devices over the one or more networks;

receiving one or more electronic user transactions initiated at one or more user platforms, each of the one or more electronic user transactions associated with at least one unique user identifier and at least one unique item identifier identifying a wearable item described in the received wearable item data to be placed in a virtual closet and rented according to a subscription, wherein the one or more user platforms comprise one or more user interfaces accessible from one or more user devices over the one or more networks;

receiving one or more wearable item operations requests from at least one of the electronic warehouse operations portal, the electronic administrative portal, and the one or more electronic tenant interfaces to initiate order processing of the wearable item identified by the unique user identifier and the unique item identifier for a user identified by the received unique user identifier;

in response to receiving the one or more wearable item operations requests, initiating one or more microservices to fulfill the one or more wearable item operations requests; and in response to receiving the one or more electronic user transactions and the one or more wearable item operations requests, updating one or more transaction databases and one or more analytics databases, based on the one or more electronic user transactions to initiate shipping of the wearable item to the user at a physical address.

16. The non-transitory computer-readable medium of claim 15,
wherein the one or more electronic user transactions comprise at least one of an order placement, an order tracking, and a return notification.

17. The non-transitory computer-readable medium of claim 16, wherein the one or more microservices comprise at least one of order processing, inventory location, garment allocation, fulfillment, and return processing.

18. The non-transitory computer-readable medium of claim 15, wherein the steps further comprise:
consolidating data from the one or more transaction databases, the one or more analytics databases, and one or more external systems, into one or more data warehouse systems.

19. The non-transitory computer-readable medium of claim 18, wherein the steps further comprise:
generating one or more of an ad hoc report and a scheduled report, based on the consolidated data in the one or more data warehouse systems.

* * * * *